(12) United States Patent
Ueda et al.

(10) Patent No.: US 7,471,408 B2
(45) Date of Patent: Dec. 30, 2008

(54) IMAGE PROCESSING DEVICE

(75) Inventors: Naofumi Ueda, Nara (JP); Yuji Okamoto, Soraku-gun (JP); Atsuhiko Murakami, Nara (JP); Toshihiro Yamanaka, Ikoma (JP); Toshihiko Fukuhara, Yamatokoriyama (JP); Shuhji Fujii, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 1126 days.

(21) Appl. No.: 10/620,757

(22) Filed: Jul. 17, 2003

(65) Prior Publication Data
US 2004/0027603 A1 Feb. 12, 2004

(30) Foreign Application Priority Data

| Jul. 18, 2002 | (JP) | ............................ 2002-209423 |
| Aug. 1, 2002 | (JP) | ............................ 2002-224356 |
| Aug. 1, 2002 | (JP) | ............................ 2002-224361 |

(51) Int. Cl.
G06F 15/00 (2006.01)
G06F 3/12 (2006.01)

(52) U.S. Cl. .................... 358/1.15; 358/1.13; 358/1.14; 358/1.1

(58) Field of Classification Search ............... 358/1.15, 358/1.13, 1.14, 1.1; 347/224
See application file for complete search history.

(56) References Cited

U.S. PATENT DOCUMENTS

| 6,137,729 | A | * | 10/2000 | Choi ..................... 365/185.29 |
| 6,628,936 | B1 | * | 9/2003 | Furuya .................... 455/412.1 |
| 6,633,395 | B1 | * | 10/2003 | Tuchitoi et al. ............ 358/1.14 |
| 7,170,622 | B2 | * | 1/2007 | Nobuhara et al. .......... 358/1.15 |
| 2001/0025343 | A1 | | 9/2001 | Chrisop et al. |
| 2001/0034713 | A1 | | 10/2001 | Nakai et al. |
| 2002/0124130 | A1 | * | 9/2002 | Iida et al. .................... 711/103 |
| 2002/0171867 | A1 | * | 11/2002 | Nobuhara et al. .......... 358/1.15 |

FOREIGN PATENT DOCUMENTS

| JP | 09-284572 | 10/1997 |
| JP | 9-284572 A | 10/1997 |
| JP | 2001-309099 | 11/2001 |

OTHER PUBLICATIONS

European Search Report mailed Nov. 6, 2003 in corresponding EP application No. 03016078.2.

* cited by examiner

*Primary Examiner*—Houshang Safaipour
(74) *Attorney, Agent, or Firm*—Nixon & Vanderhye P.C.

(57) ABSTRACT

A digital multifunctional device 1 comprises an image reading unit 2, a hard disk 12, an image forming unit 6 and a device control unit 8. When there is input of a new image data through the image reading unit 2 while the device control unit 8 is invalidating a preceding image data stored in the hard disk 12, the invalidation by the device control unit 8 of the preceding image data in the hard disk 12 is interrupted, and the new image data being input is utilized to invalidate the preceding image data.

13 Claims, 21 Drawing Sheets

IMAGE PROCESSING DEVICE

FIELD

The exemplary illustrative embodiment presented herein relates to an image processing device such as a digital multifunctional device composed of a scanner and a printer, and preferably relates to an image processing device connected to a communication path (such as a network) and having, in addition to the functions mentioned above, an image communicating function and a printer function. More specifically, the exemplary illustrative embodiment relates to an image processing device that temporarily stores the image data in a memory equipped to the digital multifunctional device so as to process the input image data, and invalidates the stored image data having completed processing from the memory.

DESCRIPTION OF THE RELATED ART

Conventionally, digital multifunctional devices are available in the market for electronically scanning a document image through a scanner and outputting the image data transmitted from the scanner through a printer.

Recently, improved digital multifunctional devices have appeared, equipped with a communication function to transmit and receive image data through communication with external devices.

Further, the improved digital multifunctional devices are equipped with memories for temporarily storing the image data to be processed, so that the device can process large amounts of image data and multiple jobs efficiently.

There are various types of memories (storage devices) for storing the image data, including semiconductor memories, and magnetic recording media such as hard disk devices.

Such various memories have different environments for storing the image data, such as the memory capacity, the cost, the writing speed, the readout speed, and whether it is volatile or nonvolatile.

Especially in a memory composed of a magnetic recording medium such as a hard disk, the disk (recording medium) is divided into small units, and each region is managed by a management data called FAT (file allocation table).

When data is recorded in each region of the disk (recording medium), the FAT data is updated, and when there is need to read the data stored in the regions, the reading is performed based on the FAT data.

Currently, the hard disk device is disposed in the digital multifunctional device as an auxiliary memory of the semiconductor memory, considering memory capacity, cost, and data transmission speed. While a certain volume of job data are processed on the semiconductor memory, the newly input job data is temporarily stored in the hard disk, and when the order for processing the new job data arrives, the data is read out onto the semiconductor memory for processing.

The above configuration is provided in the market as a system for processing image data (digital multifunctional device) capable of efficiently processing a large amount of job data without delay.

However, the processing of a highly confidential document data by this type of digital multifunctional device may cause security problems.

For example, the job data (image data) stored temporarily in each of the regions of the hard disk remain as data even when the job data has become unnecessary and the FAT data has been updated to store new image data, unless the newly input image data is overwritten on the region storing the unnecessary image data based on the FAT data, or unless the unnecessary image data remaining in the data region are erased forcibly.

In order to overcome this drawback, Japanese Patent Laid-Open No. 9-284572 discloses a system that forcibly erases the region storing the image data of the hard disk or overwrites irregular pattern images created by random numbers on the region when the process to the image data is completed in the digital multifunctional device, so that the stored data cannot be reproduced as image.

However, strictly speaking, since the memory is composed of a magnetic storage medium, the previously stored image data is not completely impossible to read even after overwriting new image data or specific pattern on the data once, or by erasing the data.

Further, the operation for overwriting pattern images created by random numbers on the regions storing the image data or by formatting (clearing or substituting the data of) the image regions storing the image data in order to invalidate the image data stored in the hard disk takes much time, and if new image data is input during this invalidation operation, the new data cannot be accepted right away, and the input operation of the image data is put off for some time.

Especially, the invalidation process performed to the memory region of the image data in the hard disk may be repeated for a predetermined number of times so as to improve the security level of the data, but during this time, the processing of new image data will be put off and delayed.

SUMMARY

Therefore, the exemplary illustrative embodiment presented herein aims at solving the above-mentioned problems of the prior art. A feature of the exemplary illustrative embodiment is achieved by providing an image processing device according to which the invalidation process for the image data stored in the image data storage unit (memory) is repeated for a number of times to the region storing the image data according to its security level so as to achieve sufficient protection of confidentiality of the image data, while on the other hand taking measures not to deteriorate the efficiency for accepting new image data in the image processing device while invalidating the unnecessary image data.

The image processing device according to the exemplary illustrative embodiment comprises: an image data input unit for inputting image data; an image data storage unit for storing the image data input through the image data input unit; an image data processing unit for processing the image data stored in the image data storage unit; and an image data invalidation unit for invalidating the image data stored in the image data storage unit; wherein when there is input of a new image data through the image data input unit while the image data invalidation unit is performing invalidation of a preceding image data stored in the image data storage unit, the image data invalidation unit comprises a function to interrupt the invalidation of the preceding image data stored in the image data storage unit so as to invalidate the preceding image data with the new image data being input to the device.

According to the above-mentioned configuration, if the device confirms input of a new image data through the image data input unit while the invalidation process by the image data invalidation unit for a preceding image data stored in the image data storage unit is underway, the device interrupts the invalidation of the preceding data stored in the image data storage unit by the image data invalidation unit, and stores the new image data to the memory region storing the preceding mage data.

According to this feature of the exemplary illustrative embodiment, the present device can accept new image data to be input to the device for processing and can process the new image data without delay, while improving the security level of the image data processed by the device.

Further, the image processing device according to an exemplary illustrative embodiment comprises: an image data input unit for inputting image data; an image data storage unit for storing the image data input through the image data input unit; an image data processing unit for processing the image data stored in the image data storage unit; and an image data invalidation unit for invalidating the image data stored in the image data storage unit; wherein when there is input of a new image data through the image data input unit after the image data invalidation unit has completed the invalidation of a preceding image data being stored in the image data storage unit, the image data invalidation unit comprises a function to invalidate the preceding image data with the new image data being input to the device.

According to this configuration, if new image data is input through the image data input means when the image data invalidation unit has completed invalidating the preceding image data stored in the image data storage unit, the device stores the new image data in the region in which the preceding image data has been stored.

According thereto, the present device can accept input of new image data to the device for processing and can process the new image data without delay, while also improving the security level of the image data accepted by the device.

Moreover, the image processing device of the exemplary illustrative embodiment characterizes in that the image data invalidation unit comprises a function to invalidate the new image data together with the preceding image data when performing invalidation of the new image data being input through the image data input unit.

According to this configuration, the image data invalidation unit invalidates the new image data together with the preceding image data when performing invalidation of the new image data input to the device through the image data input unit.

Thus, the present device can perform the operation for invalidating image data with improved efficiency, thereby suppressing deterioration of the ability of the device to process the image data to a minimum.

Furthermore, the security level of the image data at the installation site of the device can be ensured.

Moreover, the image processing device of an exemplary illustrative embodiment comprises: an image data input unit for inputting image data; an image data storage unit for storing the image data input through the image data input unit; an image data processing unit for processing the image data stored in the image data storage unit; and an image data invalidation unit for invalidating the image data stored in the image data storage unit; wherein when there is input of a new image data through the image data input unit while the image data invalidation unit is performing invalidation of a preceding image data being stored in the image data storage unit, the image data invalidation unit comprises a function to interrupt the invalidation of the preceding image data stored in the image data storage unit so as to store in the image data storage unit the new image data being input to the device.

Another example of the image processing device of the exemplary illustrative embodiment comprises: an image data input unit for inputting image data; an image data storage unit for storing the image data input through the image data input unit; an image data processing unit for processing the image data stored in the image data storage unit; and an image data invalidation unit for invalidating the image data stored in the image data storage unit; wherein the image data invalidation unit comprises a function to interrupt the invalidation of a preceding image data stored in the image data storage unit when input of a new image data through the image data input unit is confirmed while the image data invalidation unit is performing invalidation of the preceding image data being stored in the image data storage unit, so as to store the new image data in a region of the image data storage unit that is different from the region in which the preceding image data is stored.

According to the above-mentioned exemplary illustrative embodiment, when input of a new image data through the image data input unit is confirmed while the image data invalidation unit is performing invalidation of the preceding image data being stored in the image data storage unit, the invalidation performed to the preceding image data stored in the image data storage unit by the image data invalidation unit is interrupted, so as to store the new image data in a memory region that is different from the region in which the preceding image data is stored.

According thereto, the present device can accept new image data input to the device and can process the new image data without delay, while also improving the security level of the image data accepted by the device.

In another example of an exemplary illustrative embodiment, the image data invalidation unit comprises a function to invalidate the new image data together with the preceding image data when performing invalidation of the new image data being input through the image data input unit.

According to this configuration, the image data invalidation unit invalidates the new image data together with the preceding image data when performing invalidation of the new image data input to the device through the image data input unit.

Thus, the present device can perform the operation for invalidating image data with improved efficiency, thereby suppressing the deterioration of the image data processing ability of the device to a minimum.

Furthermore, the security level of the image data at the installation site of the device can be maintained.

Moreover, the image processing device characterizes in that when there is input of a new image data through the image data input unit while the image data invalidation unit is performing invalidation of a preceding image data being stored in the image data storage unit, the image data invalidation unit comprises a function to interrupt the invalidation of the preceding image data stored in the image data storage unit so as to store in the image data storage unit the new image data being input to the device.

In another example of the exemplary illustrative embodiment, the image processing device comprises an image data input unit for inputting image data; an image data storage unit for storing the image data input through the image data input unit; an image data processing unit for processing the image data stored in the image data storage unit; an image data invalidation unit for invalidating the image data stored in the image data storage unit; and a determination unit for determining whether to prioritize the invalidation by the image data invalidation unit of a preceding image data stored in the image data storage unit or the storage of a new image data being input through the image data input unit to the image data storage unit, based on the contents of the image data.

According to the above-mentioned exemplary illustrative embodiment, when input of a new image data is confirmed while the preceding image data stored in the image data storage unit is being invalidated by the image data invalidation unit, the determination means determines whether to prioritize the invalidation of the preceding image data in the image data storage unit or the storage of a new image data being input to the device, and based on the contents of the preceding image data being subjected to invalidation, interrupts the invalidation process to accept storage of the new image data to the image data storage unit.

Thus, the present device is capable of accepting entry of new image data to be processed by the device and processing the image data without delay, while on the other hand improving the security level of the image data accepted as a job to the device.

Moreover, the present image processing device is characterized in that the determination unit is equipped with a function to determine, according to a security level set for the preceding image data being invalidated by the image data invalidation unit, whether to continue invalidation of the preceding image data by the image data invalidation unit or to interrupt the invalidation of the preceding image data by the image data invalidation unit so as to store the new image data being input through the image data input unit to the image data storage unit.

According to the exemplary illustrative embodiment presented herein, the determination unit determines whether to continue invalidation of the preceding image data or to interrupt the invalidation process to store the new image data according to the security level of the preceding image data being invalidated, judging whether the invalidation process or the new image data storage process has higher priority.

According to this feature of the exemplary illustrative embodiment, the device is capable of prioritizing the invalidation of the preceding image data over the storage of the new image data to the image data storage unit based on the security level of the image data, thus improving the security level of the image data stored in the device. On the other hand, the device is capable of prioritizing the storage of the new image data to the image data storage unit over the invalidation of the preceding image data based on the security level set for the image data, thus improving efficiency for processing the image data received by the device as a new job.

The image processing device according to the exemplary illustrative embodiment further comprises a first security level setup unit for setting up a security level for the image data being input to the device.

According to this feature of the exemplary illustrative embodiment, the security level is set using the first security level setup unit for each image data input to the device.

This is convenient for the user since the security level can be set for each image data according to the security level of the data.

Since only the selected image data having a high security level out of the various image data processed by the device are subjected to the invalidation process, delay for processing the newly input image data can be minimized.

The image processing device of the exemplary illustrative embodiment is further equipped with a second security level setup unit for setting up a security level for each route of input of the image data to the device.

According to this feature of the exemplary illustrative embodiment, the security level can be set for each input route of the image data through the second security level setup unit.

This is convenient for the user, since the security level can be set for each processing mode of the image data according to the security environment of the installation site of the image processing device.

Since only the image data processed through a selected processing mode with a high security level are subjected to the invalidation process, delay for processing the newly input image data can be minimized.

DETAILED DESCRIPTION OF THE PREFERRED EMBODIMENT

Embodiment 1 of the image processing device will now be explained with reference to the drawings.

Figure 1:
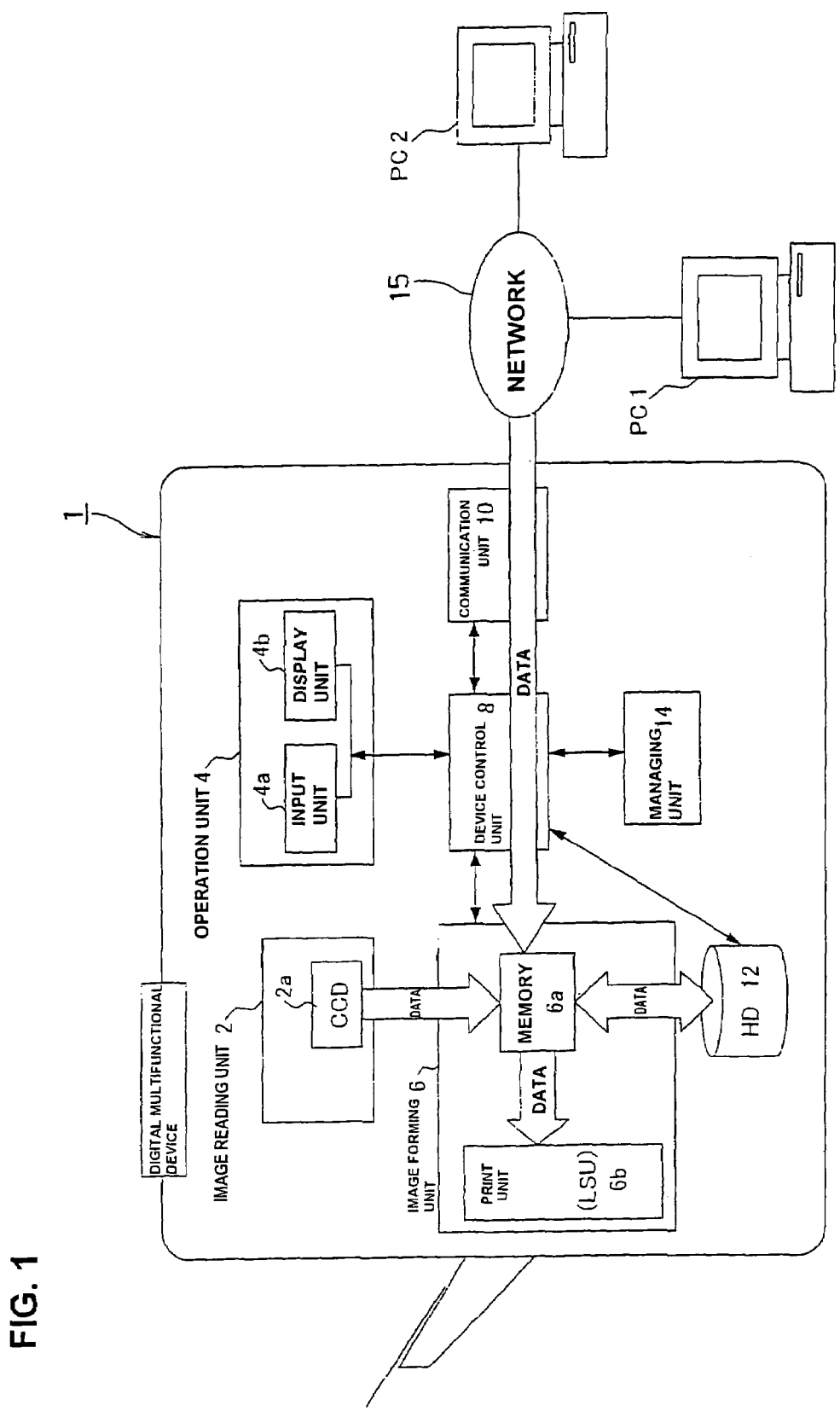
FIG. 1 is an explanatory view showing the schematic configuration of a digital multifunctional device or image processing device according to embodiment 1.

FIG. 1 is an explanatory view showing the schematic configuration of the digital multifunctional device which is the image processing device according to the first embodiment.

A digital multifunctional device 1 or image processing device according to the present invention comprises, as shown in FIG. 1, an image reading unit 2 functioning as an image data input means for inputting the image data, a hard disk 12 functioning as an image data storage means for storing the image data being entered through the image reading unit 2, an image forming unit 6 functioning as an image data processing means for processing the image data stored in the hard disk 12, and a device control unit 8 functioning as an image data invalidation means for invalidating the image data in the hard disk 12. When new image data is input through the image reading unit 2 while the device control unit 8 is performing invalidation of the image data stored in the hard disk 12, the invalidation of the preceding image data in the hard disk performed by the device control unit 8 is interrupted, and new image data being entered is used to invalidate the preceding image data.

Embodiment 1 will now be explained with reference to FIGS. 1 through 16.

As shown in FIG. 1, the digital multifunctional device 1 according to the present embodiment 1 comprises an image reading unit 2, an operation unit 4, an image forming unit 6, a device control unit 8, a communication unit 10, a hard disk (HD) 12 and a managing unit 14.

The image reading unit 2 comprises, for example, a CCD (charge coupled device) 2a as image reading device, and functions as an image data input means for inputting the image data.

The operation unit 4 comprises an input unit 4a equipped with various entry keys etc. and a display unit 4b equipped with a LCD (liquid crystal display) or other display means, for manipulating the device by entering and displaying various conditions etc.

The image forming unit 6 comprises a volatile memory 6a and a print unit 6b such as a LSU (laser scanning unit), and functions as image data output means for outputting the image data stored in the image data storage means.

The device control unit 8 and the managing unit 14 function as image data invalidation means for invalidating (erasing) the image data stored in the hard disk 12 or image data storage means based on a program set optionally.

The device control unit 8 and the managing unit 14 also function as invalidation (erase) count control means for invalidating (erasing) the object image data for a number of times repeatedly according to an optionally set program.

The communication unit 10 controls the communication between an external network.

The hard disk 12 functions as an image data storage means for storing the image data input through various input means (route of entry; various modes of the digital multifunctional device 1, such as scanner, facsimile and network).

The image data storage means can be constructed as a memory unit having a magnetic recording medium.

The managing unit 14 manages the whole device and also manages processes such as the erasing of unnecessary data.

When the digital multifunctional device 1 according to embodiment 1 is used as a copying machine, the image data of the document being read in through the image reading unit 2 is output from the image forming unit 6 as copy.

The image reading unit 2 is equipped with a CCD 2a capable of electronically reading the image of the document set to a reading position.

The image data of the document being read is completed as output image on a volatile memory 6a and then stored in the hard disk 12 temporarily.

When there are plural documents, this reading and storing operation is performed repeatedly.

Thereafter, based on the processing mode designated through the operation unit 4, the image data stored in the hard disk 12 are read out sequentially at appropriate timings and sent to the volatile memory 6a.

Then, in timing with the writing of the data to the print unit 6b, the image data is transferred from the volatile memory 6a to the print unit 6b.

Further, when the image data being input are to be printed as multiple copies, the image data is stored in page units to the hard disk 12, and in response to the output mode, the data is sent from the hard disk 12 to the volatile memory 6a, and then transferred therefrom to the print unit 6b repeatedly for a number of times corresponding to the number of copies for output in timing with the writing of data to the print unit 6b.

Next, in utilizing the digital multifunctional device 1 according to embodiment 1 as a printer, the image data received by the communication unit 10 is output from the image forming device 6 via the volatile memory 6a.

As shown in FIG. 1, the communication unit 10 is connected with a network 15 via a communication cable and the like, and can receive image data from external devices such as personal computers (PC) PC1, PC2 and so on connected to the network 15.

The image data received by the communication unit 10 are sent in page units as image data for output to the volatile memory 6a, and then stored in the hard disk 12 temporarily.

Thereafter, the data is sent again from the hard disk 12 to the volatile memory 6a before being transferred to the print unit 6b, similarly as when the device is used as a copying machine.

Moreover, when utilizing the digital multifunctional device 1 according to embodiment 1 as a network scanner, the image data of the document being read in through the image reading unit 2 can be transmitted through the communication unit 10 to an external device (PC1, PC2 . . . ) such as an arbitrary personal computer.

Also in this example, the CCD2a equipped to the image reading unit 2 is used to read the document image electronically.

Then, the document image data being read is completed as output image on the volatile memory 6a and then stored in the hard disk temporarily.

Thereafter, the data is sent from the hard disk 12 back to the volatile memory 6a, and while based on the instructions provided through the operation unit 4, a communication with a designated destination is established, and the data is transmitted via the communication unit 10 to a target destination.

Other than the network 15, the communication unit 10 is connected with a telephone circuit (not shown), so that when the digital multifunctional device 1 according to the present embodiment is utilized as a facsimile, a similar operation is performed.

In the present explanation, the digital multifunctional device 1 is equipped with a hard disk 12 functioning as a storage for temporarily storing the image data, but the present invention is not limited to such example. The digital multifunctional device 1 can also be equipped with a nonvolatile memory capable of maintaining the image data stored thereto even when it is removed from the device body, or a memory having a backup function, or other memory units (media) utilizing magnetic recording media.

Each component constituting the digital multifunctional device 1 according to embodiment 1 is controlled through the device control unit 8, which monitors the instructions for operation entered by the user through the input unit 4a, such as tablets and key groups, equipped to the operation unit 4, and displays the guidance information to be notified to the user, such as information related to the status of the digital multifunctional device 1, through the display unit 4b.

The managing unit 14 manages the information related to the various units or components controlled by the device control unit 8, and based on this information, the device control unit 8 controls the overall operation of the digital multifunctional device 1.

As shown in FIG. 1, the digital multifunctional device 1 of the exemplary illustrative embodiment comprises an image reading unit 2 for inputting image data, a hard disk 12 for storing the image data being entered through the image reading unit 2, an image forming unit 6 for processing the image data being stored in the hard disk 12, and a device control unit 8 for invalidating the image data in the hard disk 12. The device control unit 8 is equipped with a function to invalidate a preceding image data with a new image data being input when new image data is entered through the image reading unit 2 at a timing in which the invalidation of the preceding image data stored in the hard disk 12 has been completed by the device control unit 8.

According to the digital multifunctional device 1 of the exemplary illustrative embodiment, the device control unit 8 has a function to invalidate a new image data together with a preceding image data when invalidating the new image data being newly entered through the image reading unit 2.

The digital multifunctional device 1 according to the exemplary illustrative embodiment comprises, as shown in FIG. 1, an image reading unit 2 for entering the image data, a hard disk 12 for storing the image data being entered through the image reading unit 2, an image forming unit 6 for processing the image data stored in the hard disk 12, and a device control unit 8 for invalidating the image data stored in the hard disk 12. The device control unit 8 is equipped with a function to interrupt (suspend) the invalidation of a preceding image data stored in the hard disk 12 by the equipment control unit 8 and to store a newly entered image data in the hard disk 12, when a new image data is input through the image reading unit 2 while the equipment control unit 8 is invalidating the preceding image data stored in the hard disk.

Next, the operation unit 4 composed of the input unit 4a and the display unit 4b will be explained in further detail with reference to FIG. 2.

Figure 2:
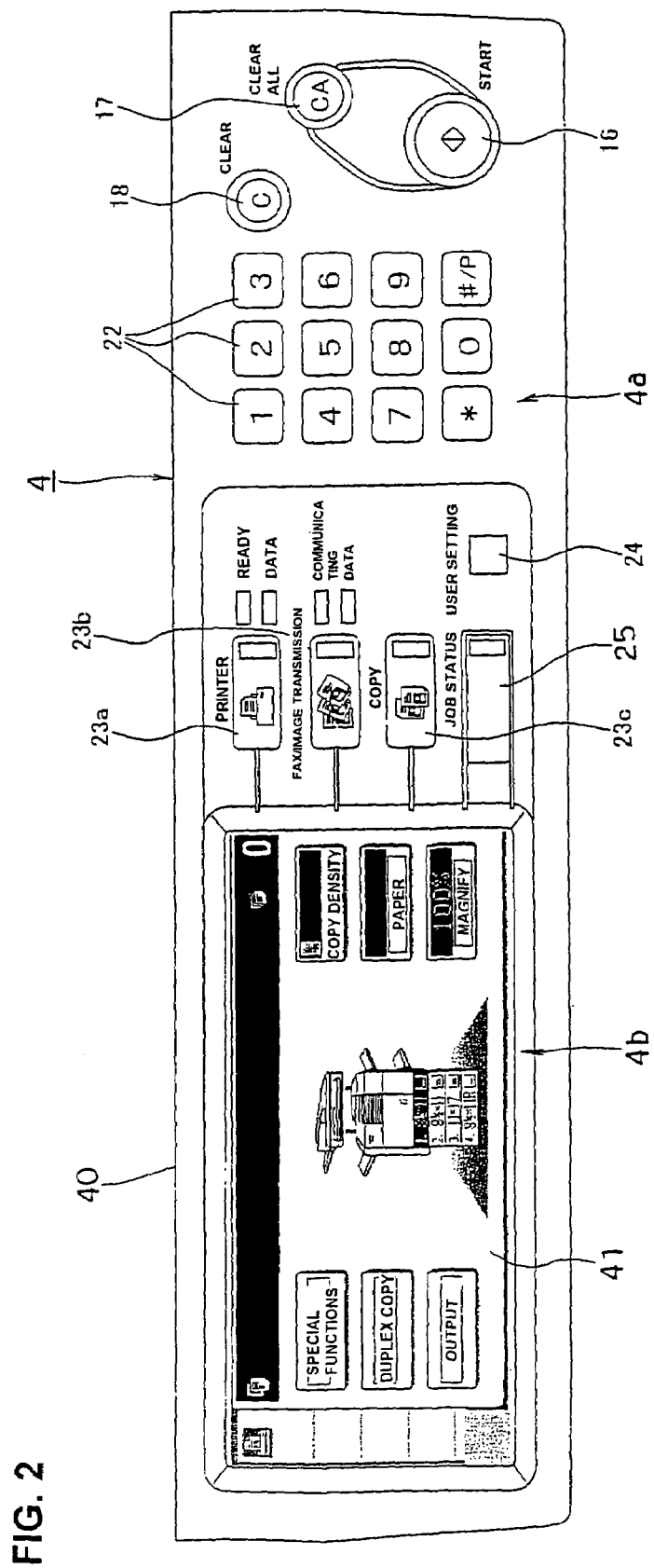
FIG. 2 is an explanatory view showing the construction of an operation unit according to the image processing device of an exemplary illustrative embodiment.

FIG. 2 is an explanatory view illustrating the operation unit 4 in detail.

As explained earlier with reference to FIG. 1, the operation unit 4 comprises an input unit 4a and a display unit 4b, and the operation unit 4 is composed of an operation panel 40 as shown in FIG. 2.

As shown in FIG. 2, the operation panel 40 includes a LCD panel 41, a "start" key 16, an "all clear" key 17, a "clear" key 18, a "ten" key 22, a "printer" key 23a, a "fax/image transmission" key 23b, a "copy" key 23c, a "job status" key 25, a "user setup" key 24, and so on.

The display unit 4b is composed of a dot-matrix liquid crystal panel 41, capable of displaying a detailed guidance to provide necessary information to the user of the digital multifunctional device 1 according to the present embodiment.

Furthermore, a transparent touch panel (transparent tablet) is disposed on the screen of the LCD panel 41, which functions as a part of the input unit 4a for entering demands to the system by manipulating the touch panel according to the guidance information displayed on the panel 41.

Other than the above, the input unit 4a includes a group of keys that are disposed adjacent the LCD panel 41, which include a "start" key 16 for demanding the device to start copying, an "all clear" key 17 for interrupting the process being executed, a "clear" key 18 for clearing the contents of the designated mode, a "ten" key 22 for designating the number of copies to be made etc., a "printer" key 23a, a "fax/image transmission" key 23b and a "copy" key 23c functioning as mode switching keys, a "job status" key 25 for confirming the status of the jobs (reserved jobs), and a "user setup" key 24.

By manipulating the keys on the control panel 40 constituting the operation unit 4, setting of various modes are performed and the image data of the image taken in through the image reading unit 2 is processed.

As for the printer mode, basically the job data is transmitted through a network 15, so the manipulation through the keys on the control panel 40 are limited to specific operations of the job data transferred to the digital multifunctional device 1 such as the confirmation (invocation) of the job or canceling of the job.

Next, the security system equipped to the digital multifunctional device 1 according to embodiment 1 will be explained.

As for the simplified process flow, the image data to be processed in the device is stored temporarily in the hard disk 12.

Thereafter, when the stored image data is no longer necessary such as when the data has been processed completely or when the data has been designated to be cleared, the data is erased (invalidated) from the hard disk 12.

At this time, the stored image data is subjected to an erase (invalidation) process according to the security level being set.

The following explanation refers to a copying operation in which the document image data is read into the device and then output through the printer as recorded matter, but the present embodiment is not limited to such example, and the same process can be applied when the present digital multifunctional device is utilized as a printer or as a transmission device (facsimile or network scanner) in which the image data read into the device via a scanner is transmitted.

FIGS. 3 through 11 illustrate the screens displayed on the LCD panel 41 of FIG. 2, which explain how the display 4b changes according to each step for erasing (invalidating) the unnecessary image data stored in the hard disk 12 according to its security level when the "image data erase process" for erasing the image data temporarily stored in the hard disk 12 is active.

Figure 12:
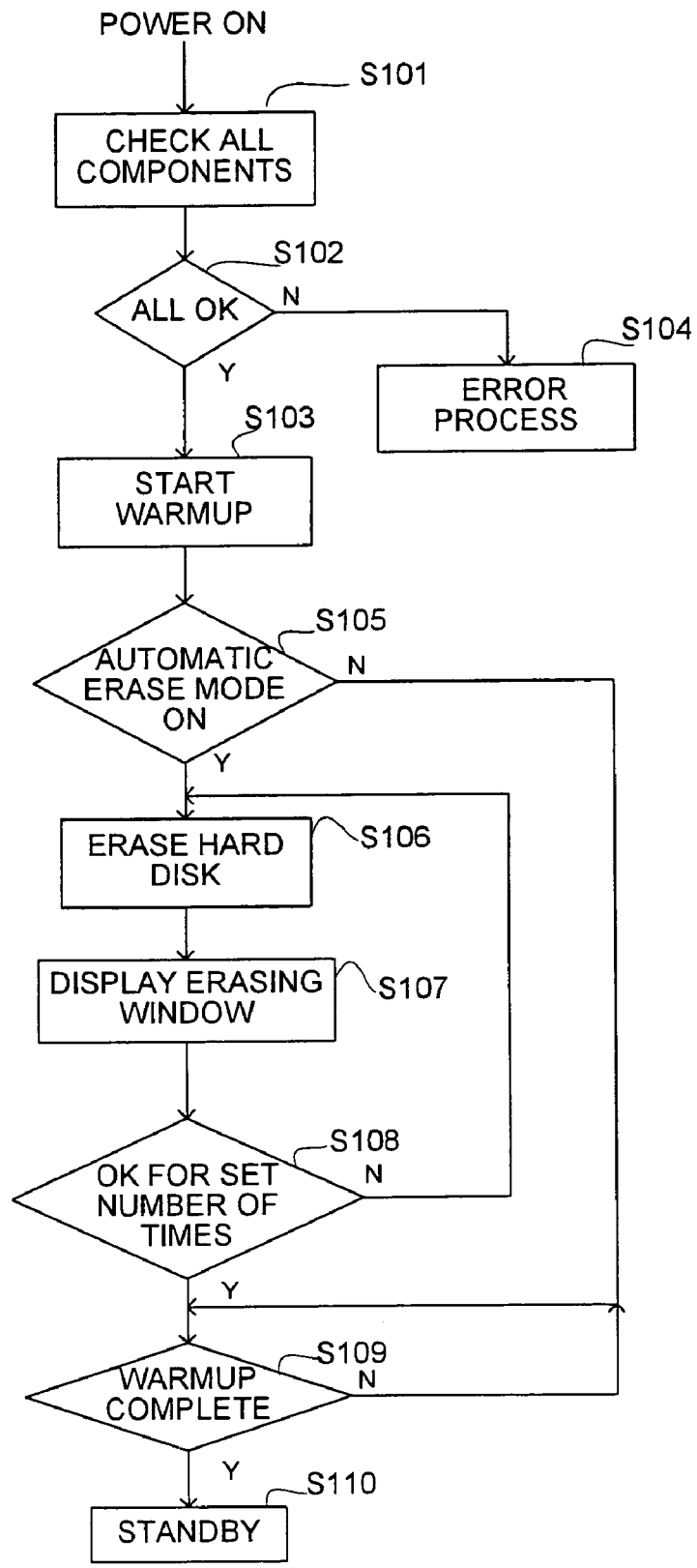
FIG. 12 is a flowchart (number 1) explaining the flow of the process for copy mode.

FIG. 12 is a flowchart showing the sequence of processes for performing a copying operation by the digital multifunctional device and then erasing the image data on the hard disk 12 according to embodiment 1.

Figure 3:
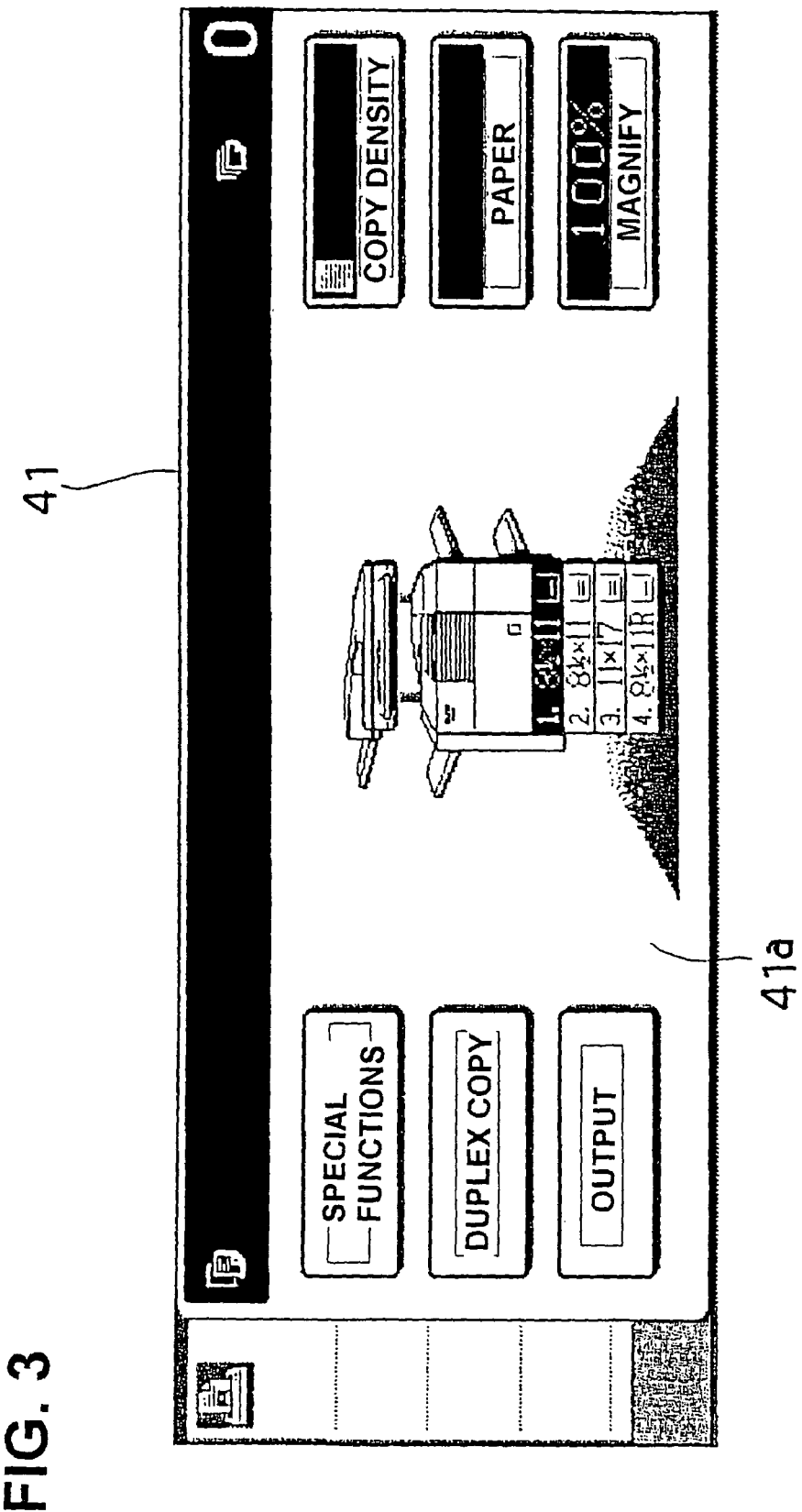
FIG. 3 is an explanatory view of a screen displayed on the LCD panel of FIG. 2 (normal status)

FIG. 3 shows a display screen (basic screen) 41a of the LCD panel 41 in which the "image data erase process" has not been activated. In the digital multifunctional device 1 according to embodiment 1, the "image data erase process" is a function preinstalled to the device, but in default, this function is initially not active.

The user at the installation site of the device who wishes to set up security measures for the stored data enters and sets up a product key, so as to enable activation of the "image data erase process" function.

The art of selectively validating a preinstalled function with a product key is disclosed in Japanese Patent Laid-Open No. 2001-309099 filed by the present applicant.

Figure 4:
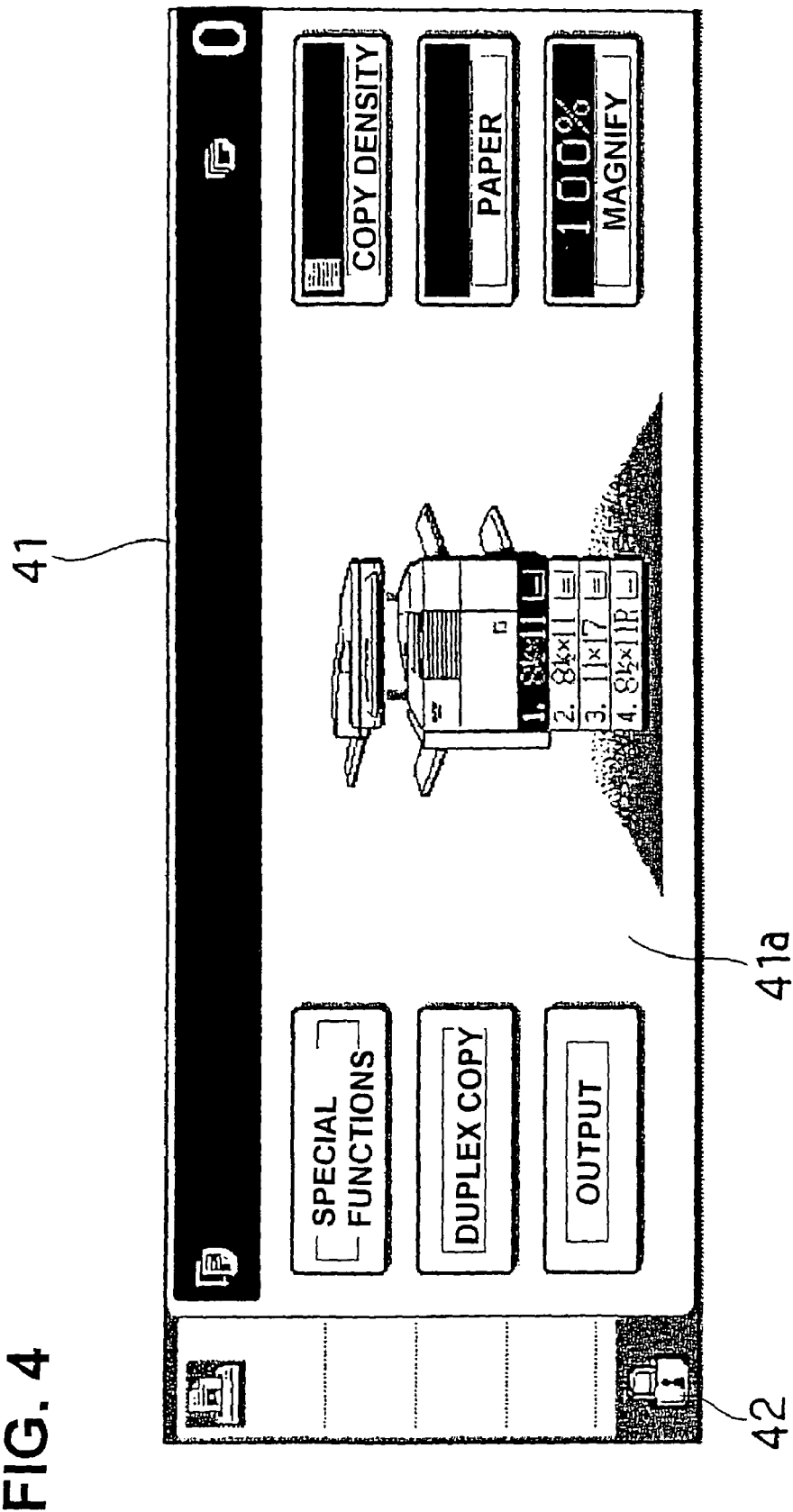
FIG. 4 is an explanatory view of a screen displayed on the LCD panel of FIG. 2 (status in which an icon indicating that an "image data erase process" is operable is displayed)

FIG. 4 is a view showing the status in which an icon 42 indicating that the "image data erase process" is in operable state is displayed on the lower left corner of the screen 41a of the LCD panel 41, notifying the user that the "image data erase process" has been validated by the entry of the product key.

Figure 5:
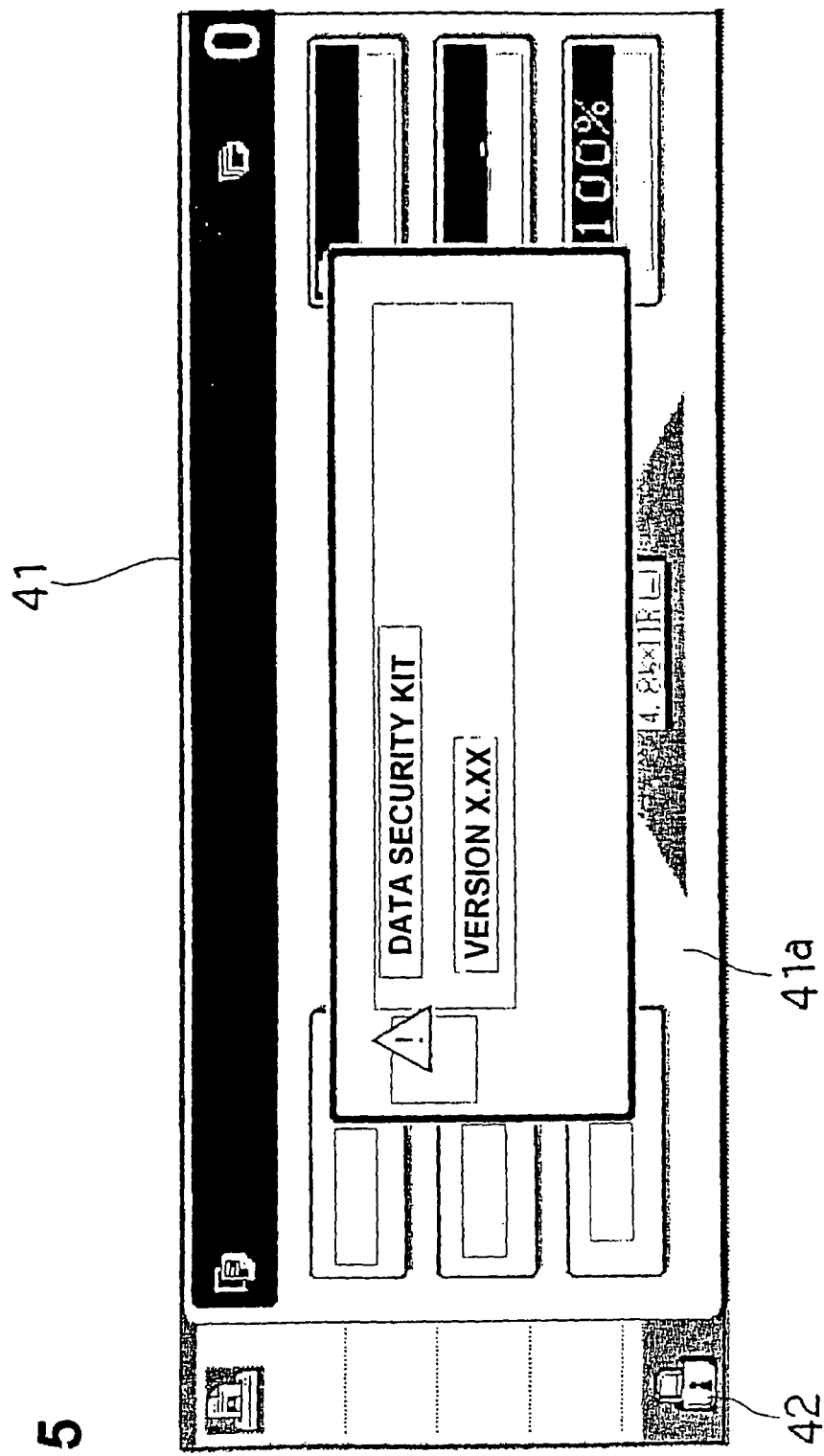
FIG. 5 is an explanatory view of a screen displayed on the LCD panel of FIG. 2 (version data display screen)
Figure 6:
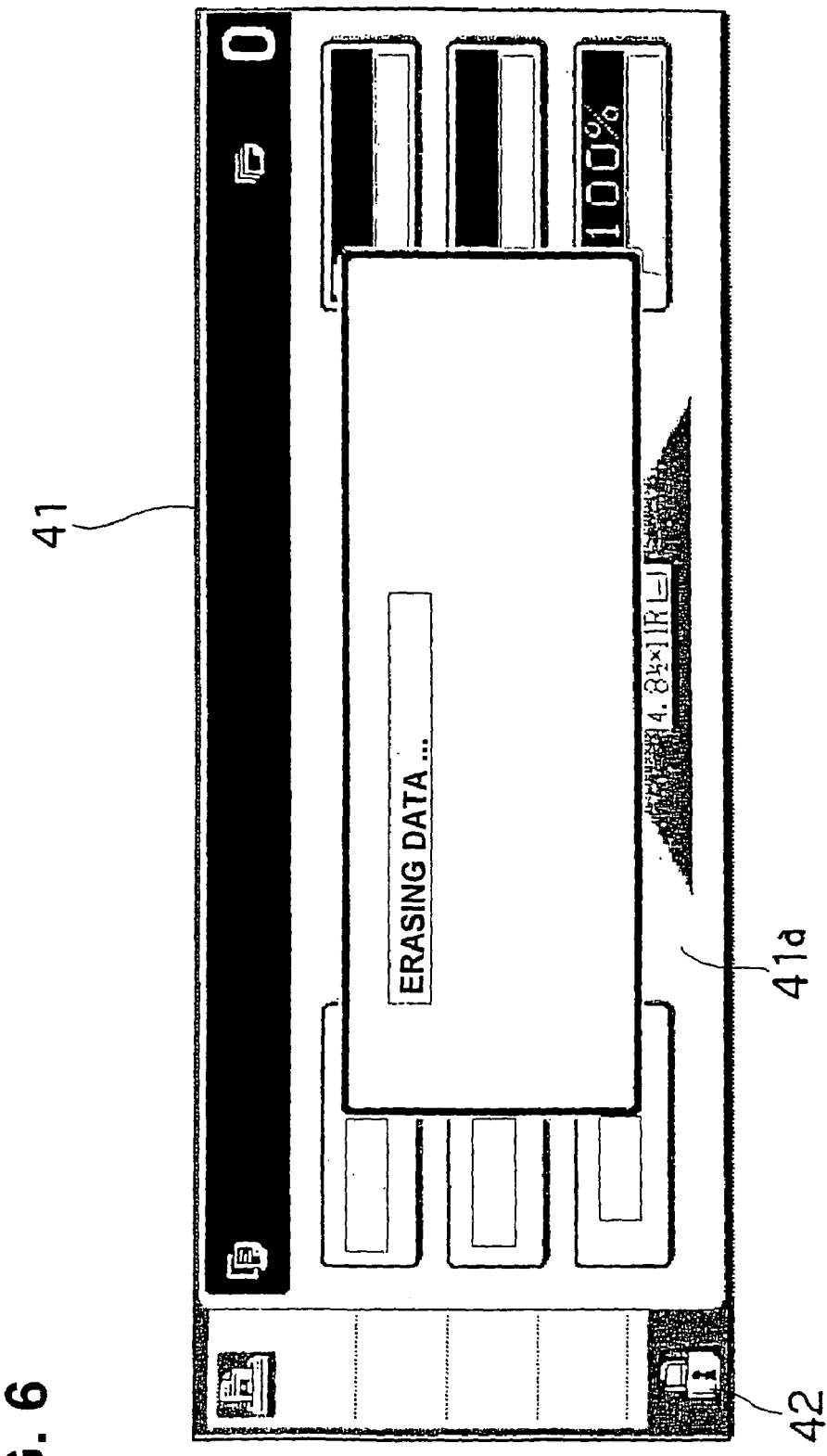
FIG. 6 is an explanatory view showing a screen displayed on the LCD panel of FIG. 2 ("image data erase process" operating screen)

When the user presses a finger against (touches) the icon 42 displayed at the lower left corner of the screen 41a of the LCD panel while the "image data erase process" is not operating (when the device is at standby), the screen 41a is changed to what is shown in FIG. 5.

Then, as shown in FIG. 5, a window is displayed substantially on the center of the screen 41 of the LCD panel 41 indicating the version etc. of the function related to the security kit.

The "image data erase function" is handled as "data security kit", which is an option in the digital multifunctional device 1, so guidance thereof is displayed in the window as "data security kit".

Thereby, the contents of the "data security kit" and the "image data erase function" or the version thereof can be confirmed.

When the "image data erase process" is operating since a job has been completed or cleared (when the data stored in the hard disk is being erased), a window is displayed at the substantial center of the screen 41a of the LCD panel 41 indicating that data is currently being erased.

Figure 7:
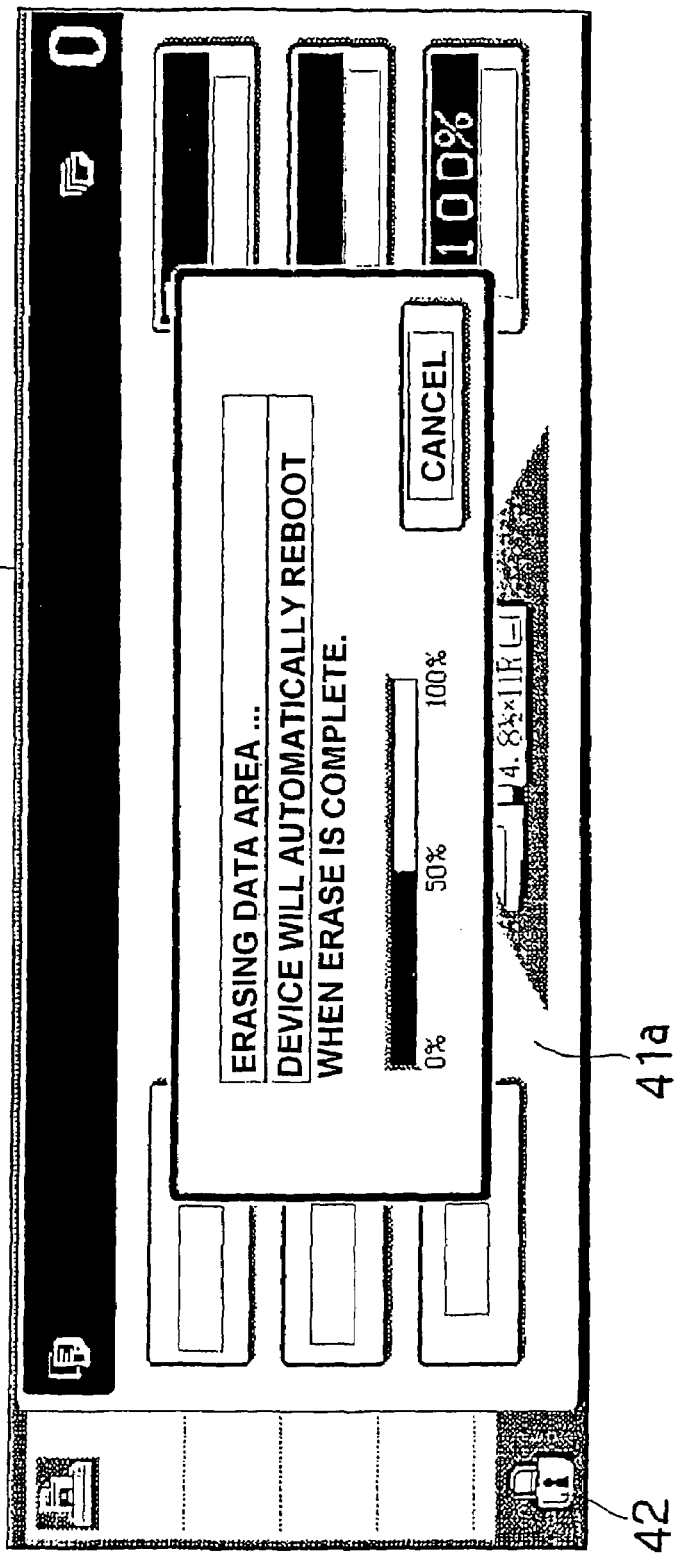
FIG. 7 is an explanatory view showing a screen displayed on the LCD panel of FIG. 2 ("image data erase process" operation status confirmation screen)

If the icon 42 on the lower left corner of the screen 41a is pressed (touched) at this time, the screen 41a displayed on the LCD panel 41 is changed to what is shown in FIG. 7.

In this screen, a window is displayed on the substantial center of the screen indicating that image data on the hard disk 12 is being erased according to the "image data erase process", and the status of progress of the process is displayed in levels.

This display enables the user to confirm the operation status of the erasing process according to the "image data erase process".

While the image data in the hard disk 12 is being erased by the "image data erase process", it may be effective to have the icon shown differently from its ordinary state, such as to have the icon blink during the erase procedure, so that the user can recognize at once that the erasing process is underway.

Figure 8:
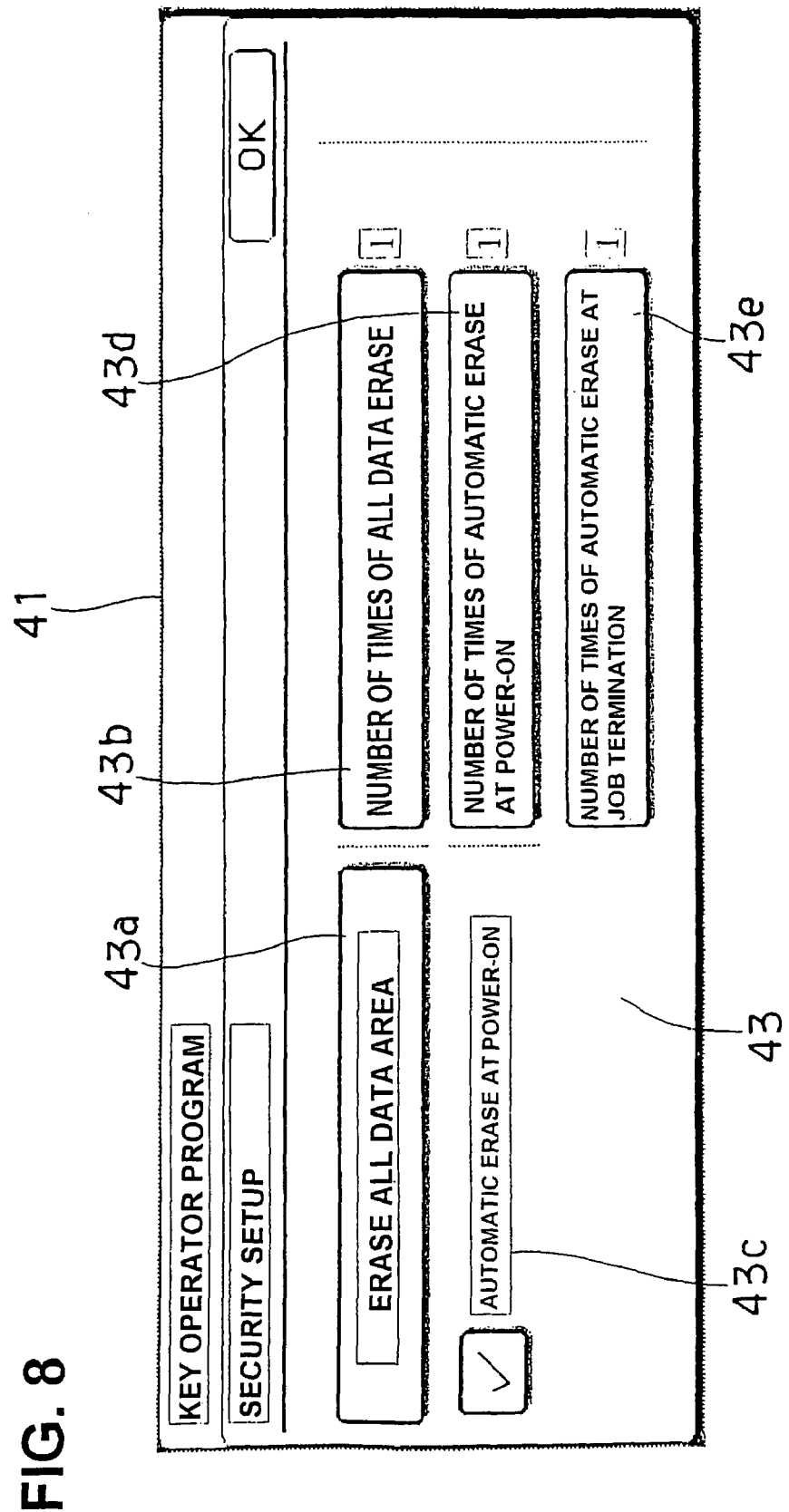
FIG. 8 is an explanatory view of a screen displayed on the LCD panel of FIG. 2 (detailed setting display screen)
Figure 9:
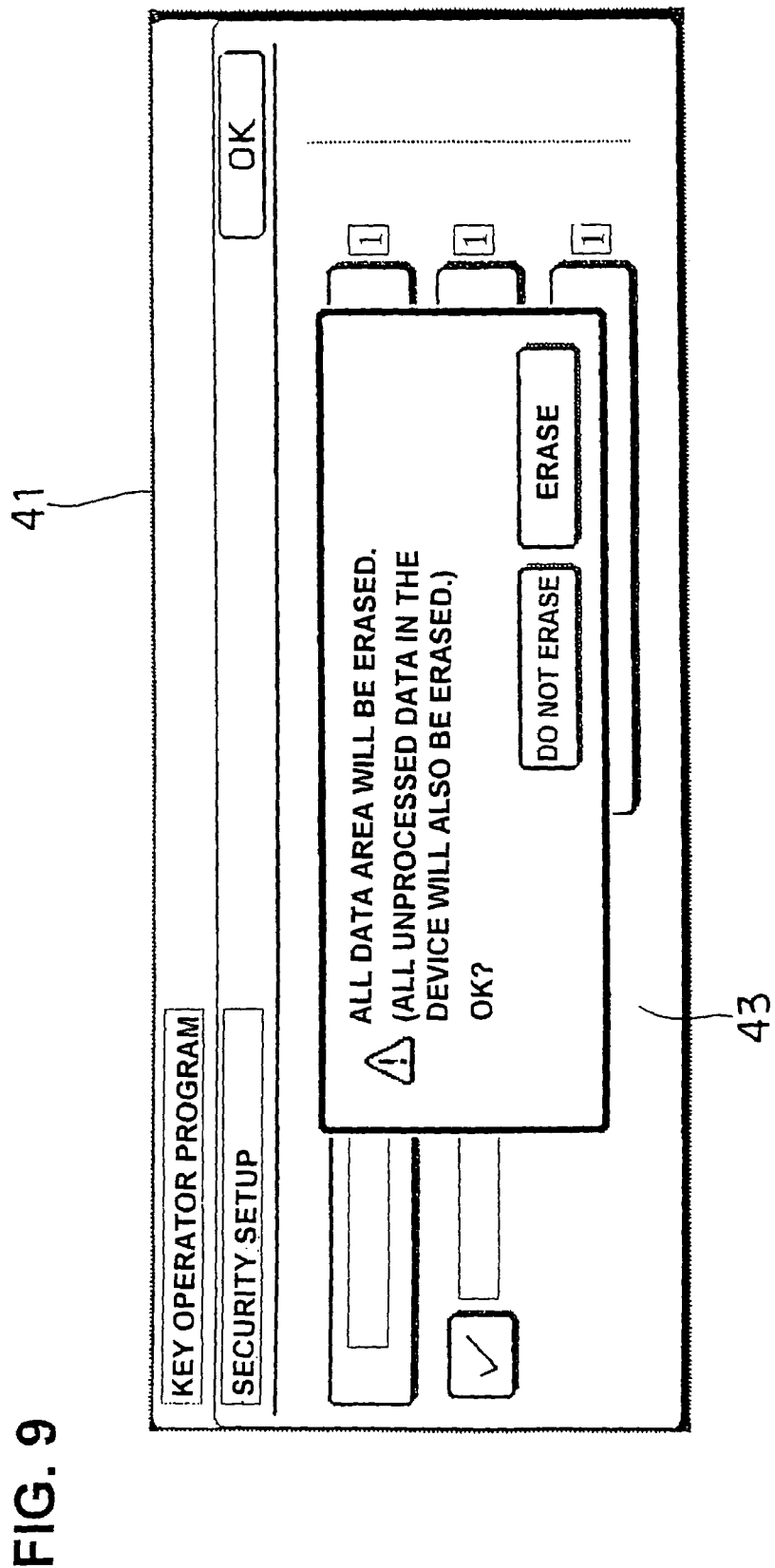
FIG. 9 is an explanatory view of a screen displayed on the LCD panel of FIG. 2 (erase confirmation screen)

FIG. 8 illustrates a detailed setup display screen (security setup screen) 43 of the LCD panel 41, enabling the user to arbitrarily set up the number of times for erasing (invalidating) the image data stored in the hard disk 12 based on the various security levels of the document data determined at the installation site, or to start the "image data erase process" to forcibly erase (invalidate) the image data stored in the hard disk.

By setting in advance the number of times of erase appropriate for the selected security level using the detailed setup display screen (security setup screen) 43, the image data will be erased repeatedly when that image data becomes unnecessary, so the security level at the installation site can be maintained, and the deterioration of the process level of the image data of the device caused by the improvement of the security level can be minimized.

Further, since the image data stored in the hard disk 12 can be erased (invalidated) at an arbitrary timing, the present embodiment is effective when the user wishes to process very important document data.

The following is a simplified explanation of the operation according to the various modes.

(All Data Area Erase Mode)

When the "all data area erase" key 43a displayed on the upper left area of the detailed setup display screen 43 on the LCD panel 41 shown in FIG. 8 is pressed, the data stored in the hard disk 12 is erased.

At this time, a confirmation window is displayed on the center of the detailed setup display screen 43 for confirmation (FIG. 9), and when the "erase" demand is selected, the erasing of data on the hard disk 12 is started.

Figure 10:
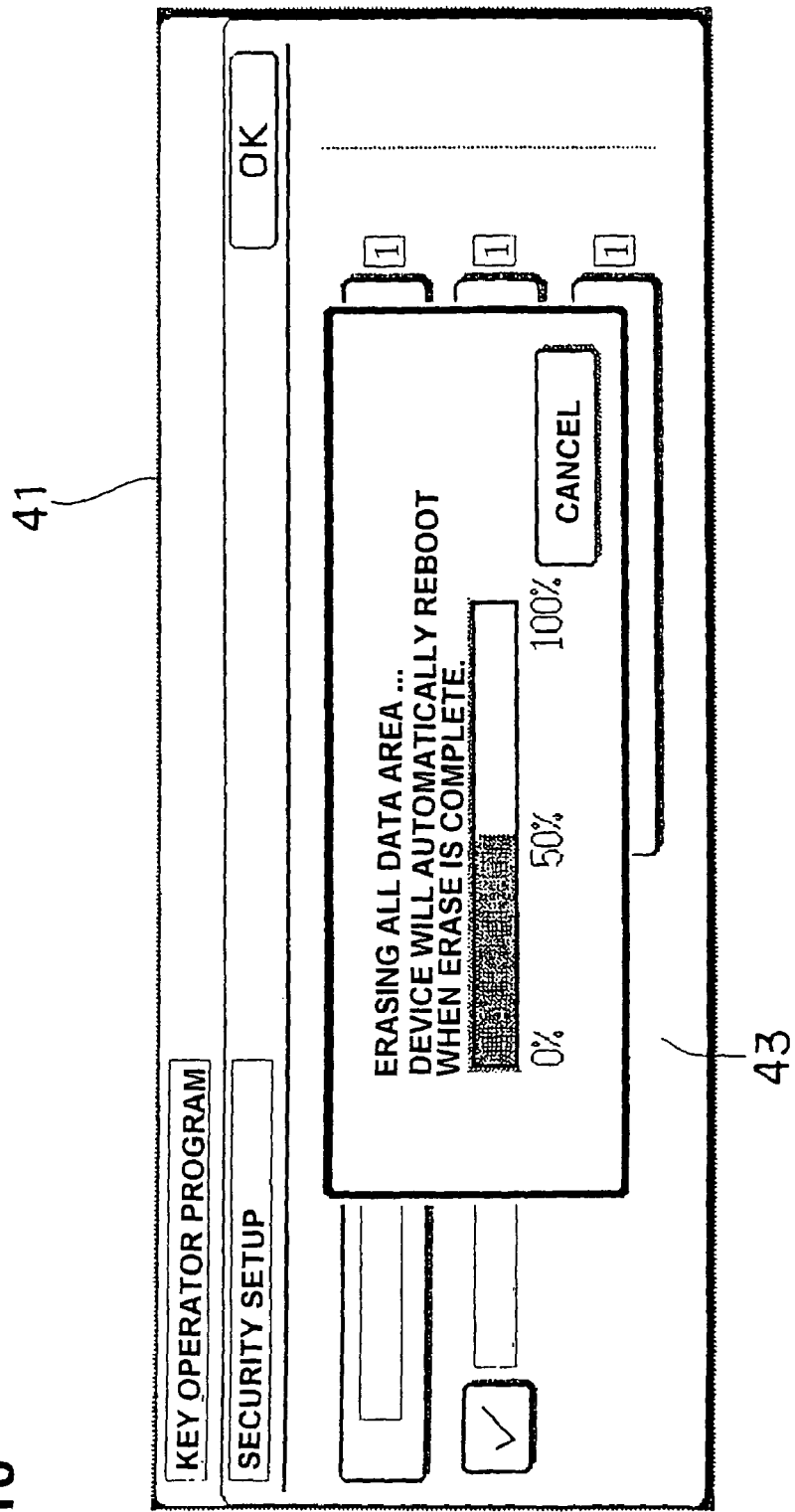
FIG. 10 is an explanatory view of a screen displayed on the LCD panel of FIG. 2 (data erase operation progress display screen)

FIG. 10 shows how the progress of the data erase operation of the hard disk 12 is displayed in level indication on the center of the detailed setup display screen 43 of the LCD panel 41.

Furthermore, on the right side of the "all data area erase" key 43a on the detail setup display screen 43 is, as shown in FIG. 8, a "number of times of all data area erase" key 43b for setting, between numbers 1 through 7, for example, the number of times for repeatedly executing the "all data area erase" process.

Next to the "number of times of all data area erase" key on the detailed setup display screen 43 is displayed the number of times that has been set up for executing the erase process (the default value is "1").

Figure 11:
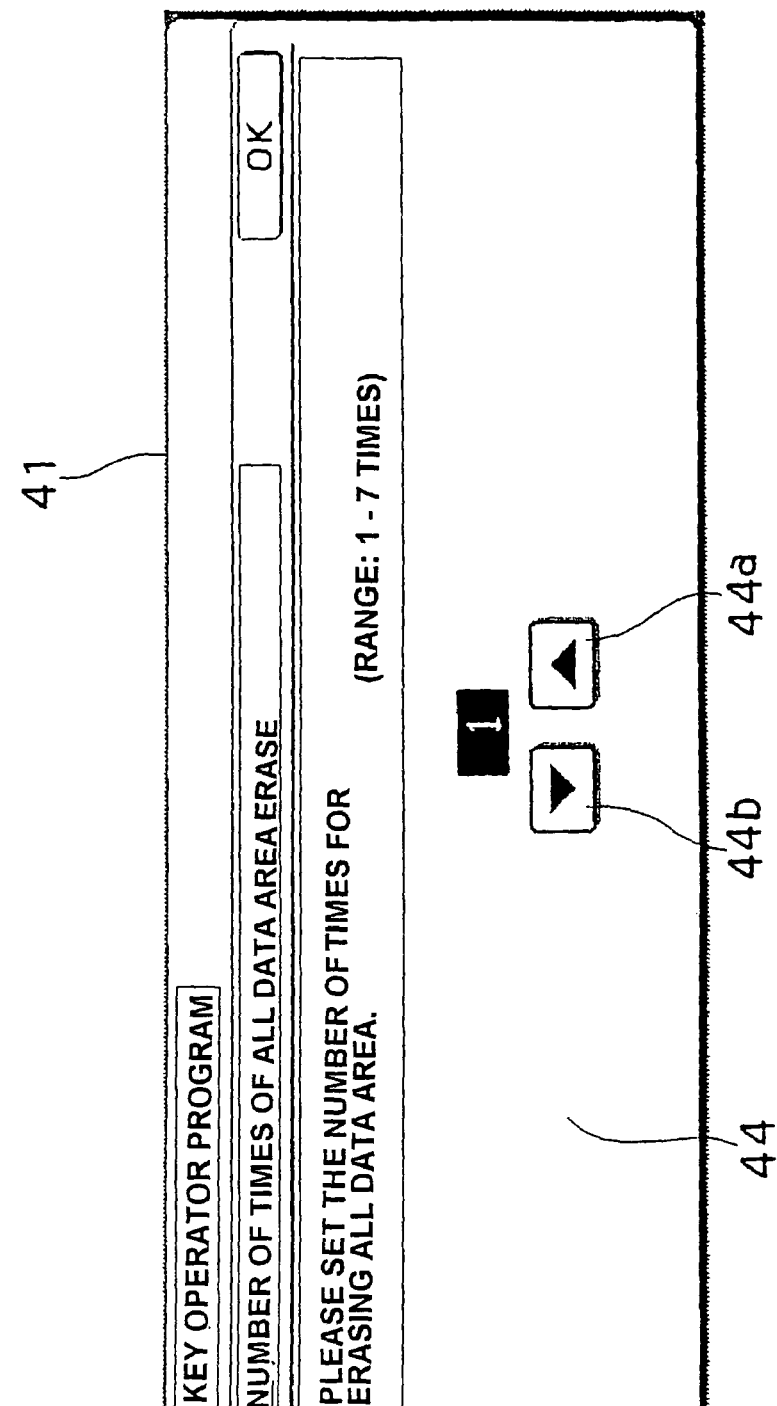
FIG. 11 is an explanatory view of a screen displayed on the LCD panel of FIG. 2 ("number of all data area erase" setup screen)

When the "number of times of all data area erase" key 43b on the detail setup display screen 43 is pressed by a finger (touched), a "number of times of all data area erase" setup screen 44 is displayed on the LCD panel 41 as shown in FIG. 11, and by manipulating an "up" key 44a or a "down" key 44b of the "number of times of all data area erase" setup screen 44, the number of times for erasing the data can be determined arbitrarily.

(Automatic Data Erase Mode at Power-On)

When an "automatic erase at power-on" key 43c displayed at the middle of the detail setup display screen 43 on the LCD panel 41 as shown in FIG. 8 is pressed (touched), a checkmark appears in the box of the key, and according to this mode, the user can set the data on the hard disk 12 to be erased every time the power of the digital multifunctional device 1 is turned on.

On the right side of the "automatic erase at power-on" key of the detail setup display screen 43 is displayed an "number of times of automatic erase at power-on" key 43d that enables the user to set up the number of times for repeatedly executing the "automatic erase at power-on", as shown in FIG. 8.

The number of times being set by the user is displayed next to the "number of times of automatic erase at power-on" key 43d of the detail setup display screen 43. According to the default status, the automatic power-on erase mode is not set, and the number is "0".

When the "number of times of automatic erase at power-on" key 43d on the detail setup display screen 43 is pressed (touched), the "number of times of all data area erase" setup screen 44 is displayed on the LCD panel 41 as shown in FIG. 11, and by manipulating the "up" key 44a or the "down" key

44b on the "number of times of all data area erase" setup screen 44, the number of times for executing erase can be determined arbitrarily.

(Automatic Data Erase Mode at Termination of each Job)

When an "number of times of automatic erase at job termination" key 43e displayed on the lower area of the detail setup display screen 43 on the LCD panel 41 shown in FIG. 8 is pressed (touched), the number of times for erasing from the hard disk 12 the data related to a completed job whenever a job is completed can be set.

When the "number of times of automatic erase at job termination" key 43e on the detail setup display screen 43 is pressed (touched), the "number of times of all data area erase" setup screen 44 is displayed on the LCD panel 41 as shown in FIG. 11, and the number of times for erasing the data can be determined, for example, between numbers 1 and 7, by manipulating the "up" key 44a or the "down" key 44b on the "number of times of all data area erase" setup screen 44.

Further, next to the "number of times of automatic erase at job termination" key 43e on the detail setup display screen 43 is displayed the number of times for repeatedly executing the automatic data erase mode when each job is completed. The default value is "1".

As far as this automatic data erase mode at job termination is concerned, the mode is set up automatically when the operation of the security kit ("image data erase process") is approved by the entry of the product key mentioned earlier.

As explained above, when the user of the device purchases the "data security kit" for security, the "image data erase function" of the image processing device becomes operable, and the number of times of operation of the "image data erase function" corresponding to the required security level at the installation site can be set.

Moreover, the user can also determine when to start the operation for erasing the data in the hard disk if necessary.

Figure 13:
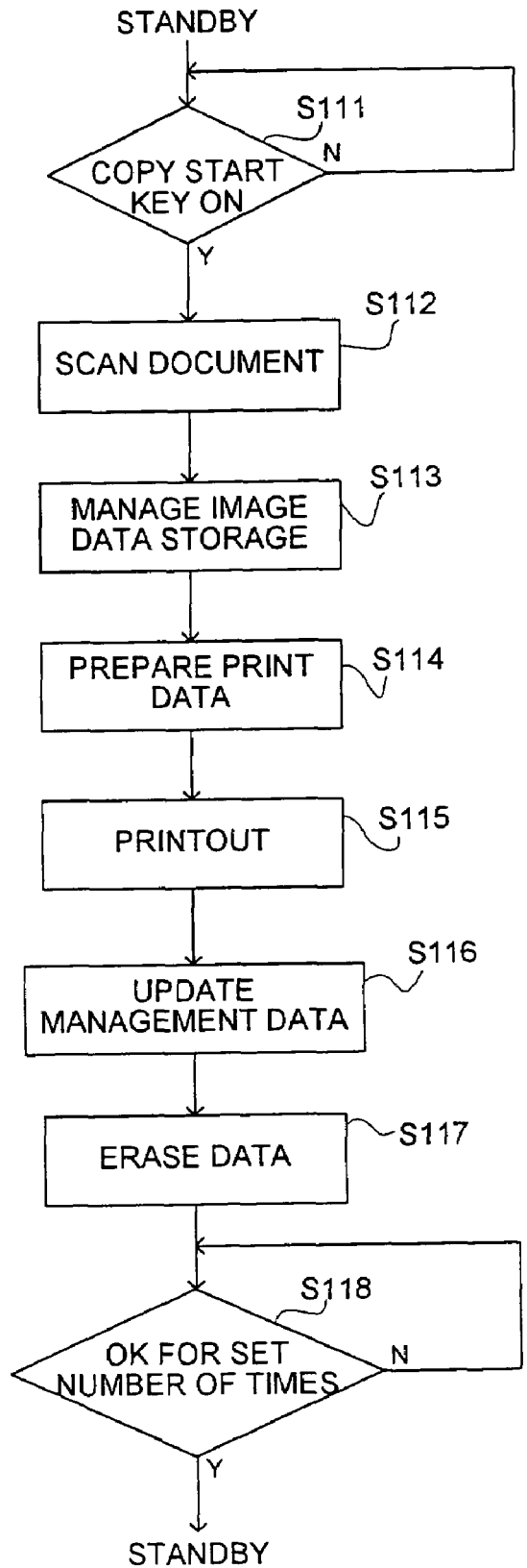
FIG. 13 is a flowchart (number 2) explaining the flow of the process for copy mode.

Now, with reference to the flowcharts of FIGS. 12 and 13, the flow of processes during a copy mode will be explained.

When the power of the digital multifunctional device 1 is turned on, the device control unit 8 checks the components that constitute the device (step S101).

When there is no problem found by the check (step S102 "Y"), warm-up is started so as to bring the device to a predetermined operable state (step S103).

On the other hand, when malfunction (defect) is recognized (step S102 "N"), an error process is executed, such as displaying a message on the screen indicating that a malfunction (defect) is found and requesting confirmation thereof (step S104).

Next, during warm-up, it is checked whether the "automatic erase mode at power-on" for initializing the hard disk at power-on is valid or not (step S105), and if this mode is set, the initialization of the hard disk 12 is started (step S106), and at the same time, the status of progress of the initialization process is displayed as a window on the screen (step S107).

At this time, the initialization or erasing of data of the hard disk 12 is repeated for a number of times set in advance through the setup screen of the LCD panel 41 as shown in FIGS. 8 and 11 (step S108)

When the above process is completed, the basic screen display as shown in FIG. 8 is displayed on the screen 41a of the LCD panel 41 of the control panel 40, and when the completion of warm-up is confirmed (step S109), the device enters a job instruction standby state (step S110).

During this standby state, if a document is mounted on the set position on the image reading unit 2 of the digital multifunctional device 1, the copy mode for the document is set, and the "start" key 16 on the control panel 40 instructing copy start is pressed (step S111), the document is electronically scanned by a CCD 2a of the image reading unit 2, and the scanned data is operated as image data on the volatile memory 6a in page units (step S112).

Then, the image data is stored temporarily in the hard disk 12 from the volatile memory 6a, and management information related to the image data stored in the hard disk 12 (such as the FAT data) are managed by the managing unit 14 (step S113).

Next, the image data stored in the hard disk 12 is read out as print data onto the volatile memory 6a once again in timing with the recording (step S114), and in timing with the printer, the data is transferred to the LSU (laser scanning unit) of the print unit 6b and printed out (step S115).

When it is confirmed that the image data has been printed out via the printer, the management data such as the FAT data are updated as process complete (step S116), and when a sequence of printing processes has been completed, the memory region to which the image data used for this sequence of printing processes is stored is subjected to the image data erase process of the hard disk 12 (step S117).

At this time, the initialization (erasing of data) of the hard disk 12 is repeated for a number of times set in advance through the setup screen of the LCD panel 41 shown in FIGS. 8 and 11 (step S118).

The above is the explanation on the basic operations for invalidating the image data on the hard disk 12 according to security levels.

Next, we will explain how the present device accepts entry of new image data while performing the erase operation of the image data in the hard disk 12, to process the image data efficiently while maintaining the security of the stored image data.

Further, as explained with reference to the security setup screen (detail setup display screen) 43 of the LCD panel shown in FIG. 8, the present image processing device (digital multifunctional device) 1 comprises three hard disk erase modes, which are "all data area erase", "automatic erase at power-on" and "automatic erase at job termination", but in the present explanation, the improvement of job efficiency during the "automatic erase at job termination" is mainly described.

This is because the "all data area erase" mode is used when there is need to forcibly erase the data on the hard disk 12, such as when processing highly confidential data, so according to this mode, the erasing of the data on the hard disk 12 has higher priority than accepting and processing a new job. Further, according to the "automatic erase at power-on" mode, the erasing of data on the hard disk is performed with higher priority, since according to this mode the device is at a warm-up mode directly after the power is switched on, so even if new image data is received, the device is not prepared to process the image data.

The following explains the case in which the "number of times of automatic erase at job termination" is set to two or more (n times) on the security setup screen 43 of the LCD panel 41 shown in FIG. 8.

Figure 14:
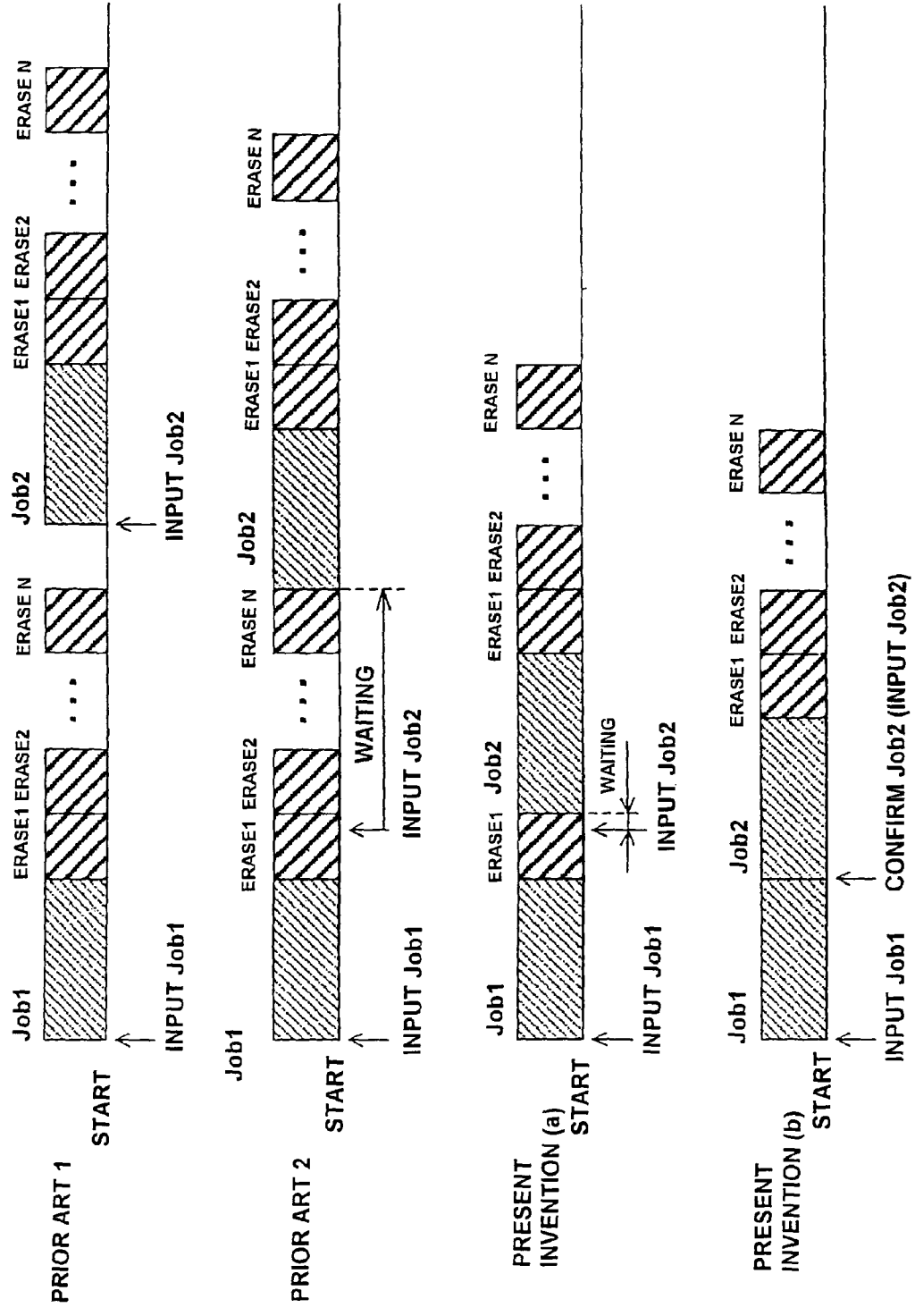
FIG. 14 is a time chart comparing the operations for processing the job in the image processing device or digital multifunctional device according to the prior art and according to an exemplary illustrative embodiment.

FIG. 14 is a time chart showing the operations for processing the job accepted by the digital multifunctional device 1 (image processing device).

The first time chart shown in FIG. 14 (prior art 1) indicates that when a preceding job being accepted is completed, the image data stored in the hard disk 12 is then invalidated (erased) repeatedly for a number of times being set in advance (n times).

After the operation for invalidation (erase) has been performed repeatedly for N times and the digital multifunctional device 1 is in standby, a new job 2 (Job2) is accepted, which is processed similarly as the preceding job 1 (Job1).

If as explained a new job is entered after the termination of the preceding job and the invalidation thereof, the processing of the new job will not be put off. However, as shown in the second time chart (prior art 2), if the new job 2 (Job2) is entered after the preceding job 1 (Job1) has been performed but while the invalidation process for the data related to the preceding job 1 is being repeatedly performed for a number of times (N times) (or at an earlier timing: after receiving and before completing Job1), the new job will be put off (put on standby) for some time.

Therefore, according to the present invention, as shown in the third time chart (a), if the new job 2 (Job2) is entered after the processing of the preceding job 1 (Job1) has been completed and while the invalidation process of the data related to the preceding job 1 is being repeatedly performed for a predetermined number of times (N times) (or at an earlier timing: after receiving and before completing Job1), the new job 2 (Job2) is accepted and executed when one sequence of erasing operations (erasing operation corresponding to a single erasing operation which will be repeated for N times) is terminated.

Then, when the processing of the new job 2 (Job2) is completed, the data related to the preceding job 1 and the new job 2 are invalidated.

Figure 15:
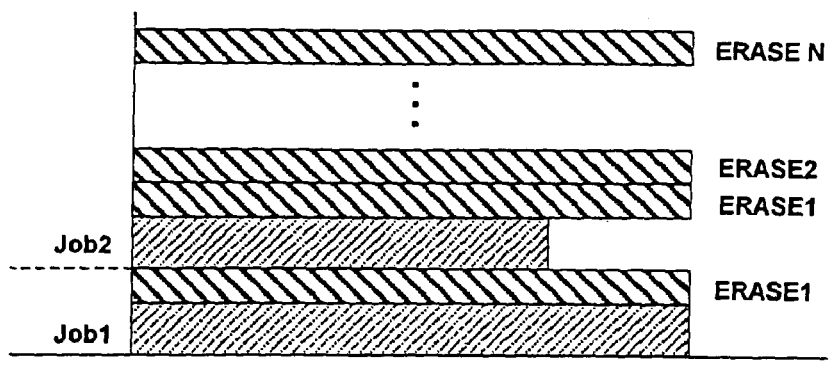
FIG. 15 is an explanatory view showing the timing for performing the data invalidation process to the regions storing the preceding job data and the new job data according to the time chart (a) of FIG. 14.

As shown in FIG. 15, according to the above-mentioned procedure, in the hard disk 12, the new job 2 is overwritten on the region storing the preceding job 1 (the region subjected to invalidation process at least once), and thereafter, when the data related to the new job 2 is no longer necessary (when new job 2 is completed), the region including the data related to the preceding job 1 and new job 2 is subjected to data invalidation process which is repeated for a predetermined number of times (N times).

As for the method of interrupting the data erase process performed in the hard disk 12, in the previous explanation it was stated that new job 2 is accepted when one sequence of erasing operations (erasing operation corresponding to a single erasing operation which will be repeated for N times) has been terminated. However, if the job data are divided and stored into plural regions (in sector units) in the memory and managed, it may be possible to manage in detail each area storing the data to be erased (manage each sector), such as how many times the data in the sector has been erased, so as to attend to the newly entered job without delay (that is, to minimize the waiting time of the user).

Moreover, according to the exemplary illustrative embodiment presented herein, as shown in the fourth time chart (b), the entry of a new job 2 (Job2) is confirmed when the process of the preceding job 1 (Job1) is completed, and when there is entry of a new job 2 (a reservation of a new job such as operation of the device or input of data), the new job is accepted and processed without staffing the invalidation process of the data related to the preceding job 1.

Then, when the process of the new job 2 is completed, the data of both the preceding job 1 and new job 2 are invalidated at once.

Figure 16:
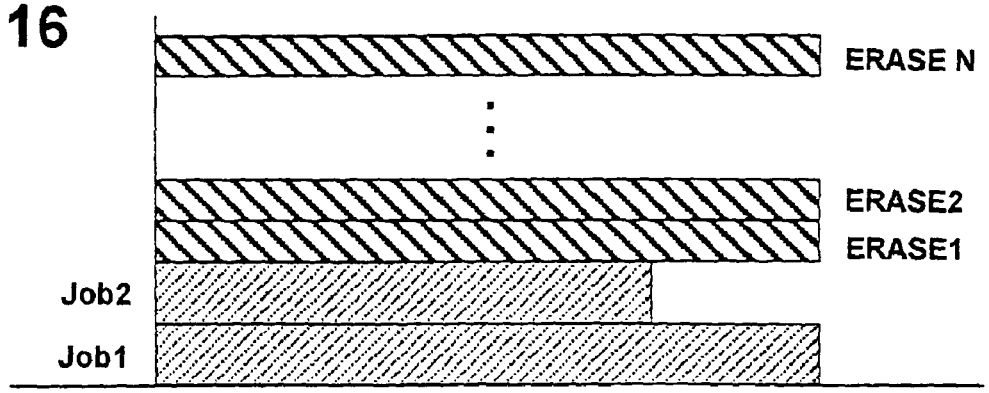
FIG. 16 is an explanatory view showing the timing for performing the data invalidation process to the regions storing the preceding job data and the new job data according to the time chart (b) of FIG. 14.

As shown in FIG. 16, according to the above-mentioned procedure, in the hard disk 12, the new job 2 is overwritten on the region storing the preceding job 1, and thereafter, when the data related to the new job 2 is no longer necessary (when new job 2 is completed), the region including the data related to the preceding job 1 and new job 2 is subjected to data invalidation process which is repeated for a predetermined number of times (N times).

According to the exemplary illustrative embodiment explained above, the following effects are achieved.

According to the image processing device of the exemplary illustrative embodiment, when new image data is entered through the image data input means while a previous image data stored in the image data storage means is being invalidated by the image data invalidation means, the invalidation process being performed to the previous image data is interrupted to store the new image data to the region storing the previous image data. Further, when invalidating the image data stored in the image data storage means, the invalidation process can be performed repeatedly to the region storing the image data for a number of times determined according to the security level of the image data, so that the confidentiality of the stored image data is maintained. Thus, the present device is capable of accepting entry of new image data and processing the new image data efficiently without delay, while improving the security level of the device for the image data being accepted.

According further to the image processing device of the exemplary illustrative embodiment, when new image data is entered through the image data input means just after termination of invalidation process of a previous image data stored in the image data storage means, the new image data can be stored in the region in which previous image data has been stored. Further, when invalidating the image data stored in the image data storage means, the invalidation process can be performed repeatedly to the region storing the image data for a number of times determined according to the security level of the image data, so that the confidentiality of the stored image data is maintained. Thus, the present device is capable of accepting entry of new image data and processing the new image data efficiently without delay, while improving the security level of the device for the image data being accepted.

According to the image processing device of the exemplary illustrative embodiment, upon invalidating the newly entered image data by the image data invalidation means, the new image data can be invalidated together with the previous image data, so that the operation for invalidating the image data can be performed efficiently, and the degradation of the image data processing ability of the device can be minimized.

Moreover, the security level of the image data entered at the installation site of the device can be ensured.

Now, with reference to the drawings, the second preferred embodiment of the present image processing device will be explained.

Figure 17:
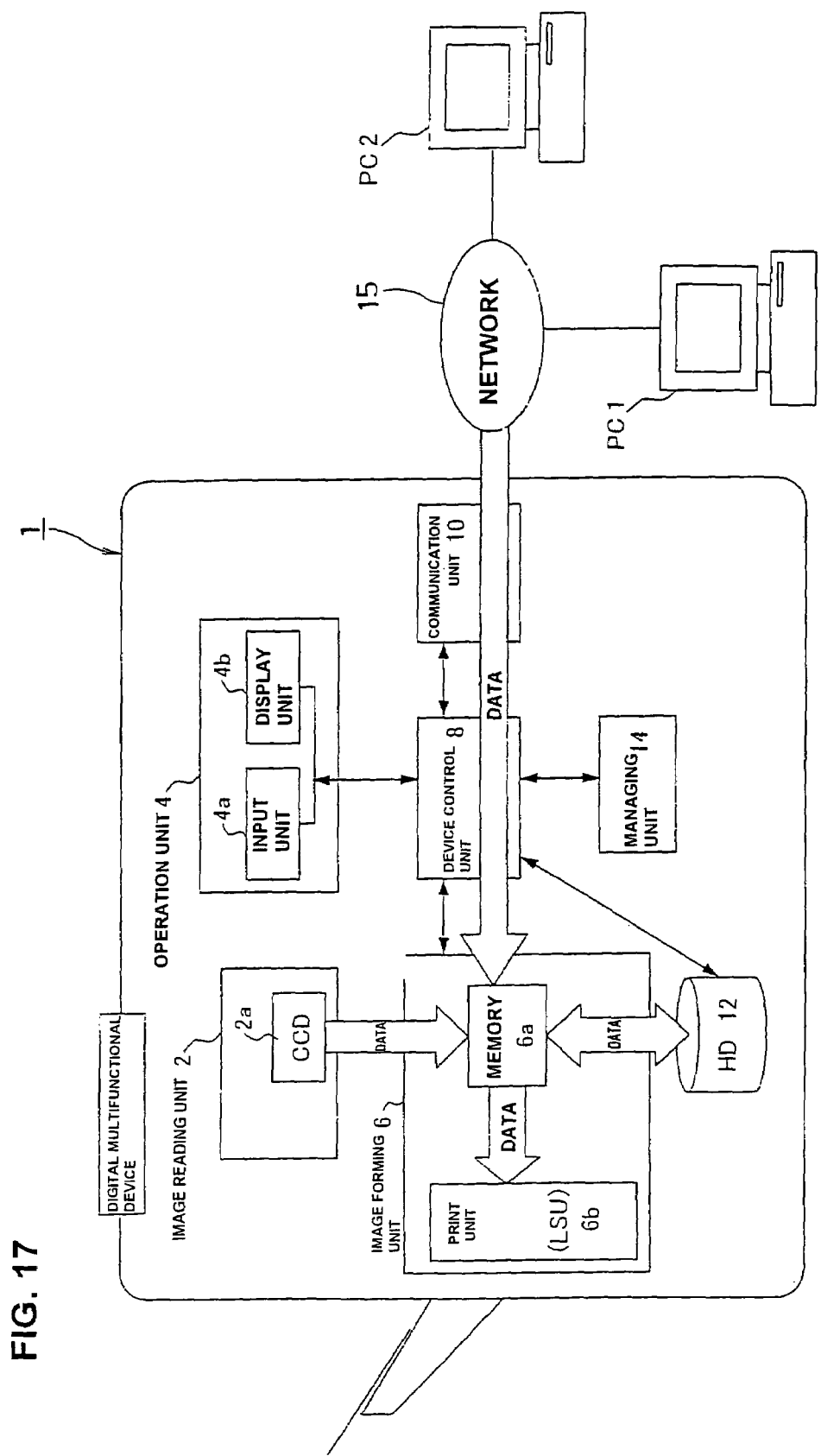
FIG. 17 is an explanatory view showing the schematic configuration of a digital multifunctional device or image processing device according to embodiment 2.

FIG. 17 is an explanatory view showing the basic configuration of a digital multifunctional device which is the image processing device according to embodiment 2.

The image processing device according to embodiment 2 is similar to the image processing device according to embodiment 1 mentioned above, and FIGS. 2 through 13 apply to the device of embodiment 2, so detailed explanations thereof are omitted.

As shown in FIG. 17, the digital multifunctional device 1 which is the image processing device of the exemplary illustrative embodiment presented herein comprises an image reading unit 2 functioning as an image data input means for entering the image data, a hard disk 12 functioning as an image data storage means for storing the image data being entered through the image reading unit 2, an image forming unit 6 functioning as an image data processing means for processing the image data stored in the hard disk 12, and a device control unit 8 functioning as an image data invalidation means for invalidating the image data in the hard disk 12. When a new image data is input through the image reading unit 2 while the device control unit 8 is invalidating the preceding image data stored in the hard disk 12, the invalidation of the preceding image data in the hard disk performed by the device control unit 8 is interrupted, and the new image data being entered is stored in a region of the hard disk 12 different from the region in which the preceding image data is stored.

According to the present digital multifunctional device 1, the device control unit 8 is equipped with a function to invalidate the new image data together with the preceding image data upon invalidating the new image data input through the image reading unit 2.

According further to the present digital multifunctional device 1, if there is entry of new image data through the image reading unit while the device control unit 8 is invalidating the preceding image data stored in the hard disk 12, the device control unit 8 discontinues the invalidation of the preceding image data in the hard disk 12 and stores the newly entered image data to the hard disk 12.

The digital multifunctional device 1 according to embodiment 2 comprises an image reading unit 2, an operation unit 4, an image forming unit 6, a device control unit 8, a communication unit 10, a hard disk (HD) 12 and a managing unit 14.

In the present digital multifunctional device 1 of embodiment 2, the image reading unit 2, the operation unit 4, the image forming unit 6, the device control unit 8, the communication unit 10, the hard disk 12 and the managing unit 14 are all the same as those constituting the digital multifunctional device 1 according to embodiment 1 shown in FIG. 1, so detailed explanations thereof are omitted.

Now, the present embodiment 2 will be explained with reference to FIGS. 18 and 19.

Figure 18:
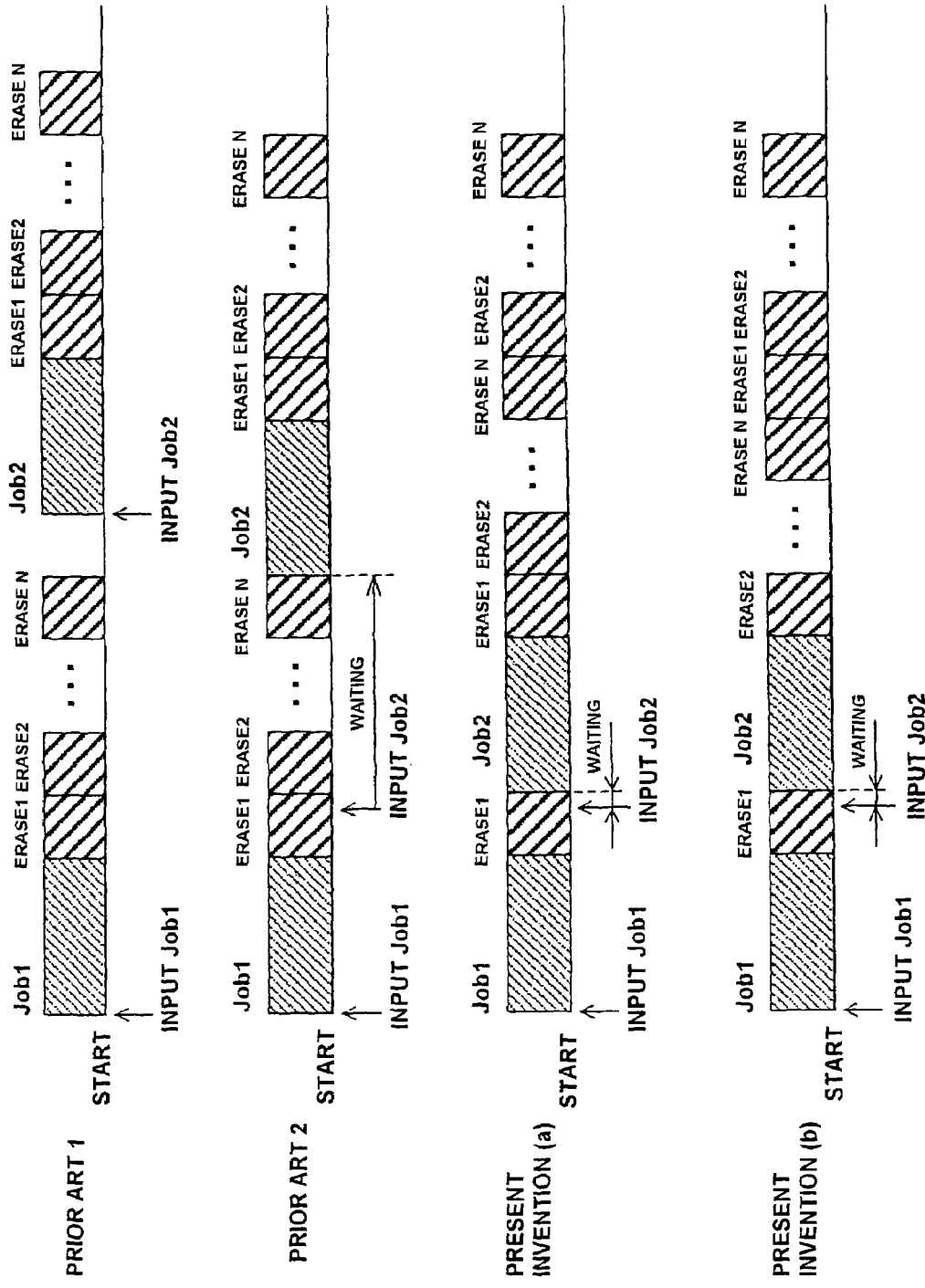
FIG. 18 is a time chart comparing the operations for processing the job in the image processing device or digital multifunctional device according to the prior art and according to an exemplary illustrative embodiment.

FIG. 18 is a time chart showing the operations for processing the job accepted by the digital multifunctional device 1 or image forming device.

The first time chart shown in FIG. 18 (prior art 1) shows that when a preceding job being accepted is performed completely, the image data stored in the hard disk 12 is invalidated (erased) repeatedly for a number of times being set in advance (N times).

After the operation for invalidation (erase) has been performed repeatedly for N times and the digital multifunctional device 1 is in standby, a new job 2 (Job2) is accepted, which is processed similarly as the preceding job 1 (Job1).

If as explained a new job is entered after the termination of the preceding job and the invalidation thereof, the process of the new job will not be put off. However, as shown in the second time chart (prior art 2), if the new job 2 (Job2) is entered after the preceding job 1 (Job1) has been completed but while the invalidation process for the data related to the preceding job 1 is repeatedly performed for a number of times (N times) (or at an earlier timing: after receiving and before completing Job1), the new job will be put off (put on standby) for some time.

Therefore, according to the exemplary illustrative embodiment presented herein, as shown in the third time chart (a) of FIG. 18, if the new job 2 (Job2) is entered after the process of the preceding job 1 (Job1) has been completed and while the invalidation process of the data related to the preceding job 1 is being repeatedly performed for a predetermined number of times (N times) (or at an earlier timing: after receiving and before completing Job 1), the new job 2 (Job2) is accepted and executed when one sequence of erasing operations (erasing operation corresponding to a single erasing operation which will be repeated for N times) is terminated.

Then, when the process of the new job 2 (Job2) is completed, the data related to the preceding job 1 and the new job 2 are invalidated.

Figure 19:
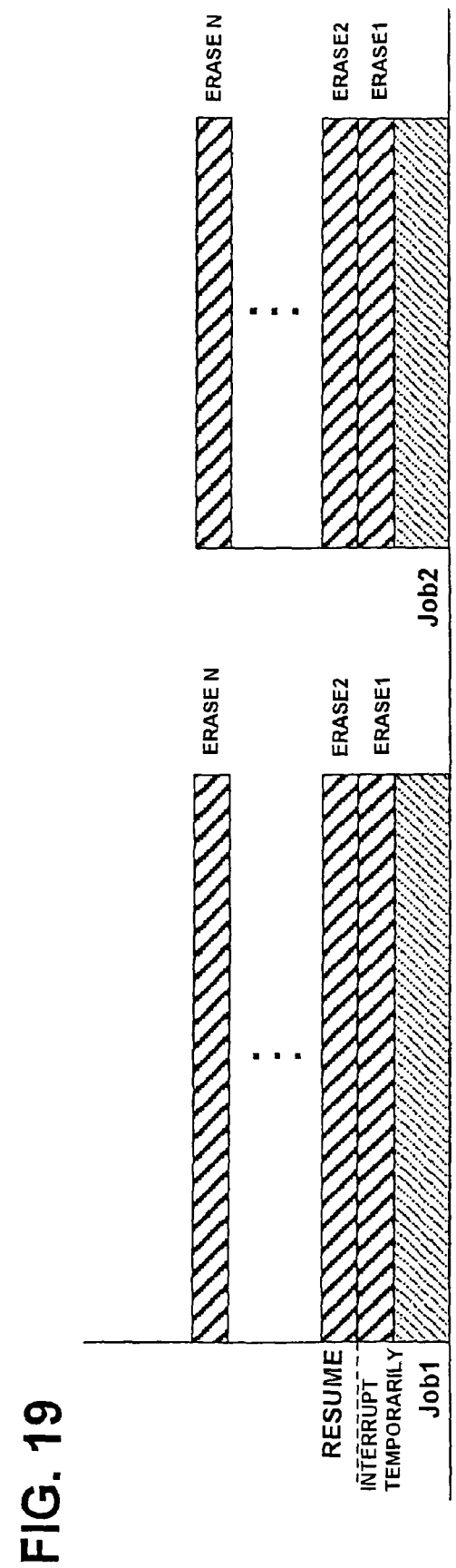
FIG. 19 is an explanatory view showing the timing for performing the data invalidation process to the regions storing the preceding job data and the new job data according to time charts (a) and (b) of FIG. 14.

In the hard disk 12 during the above procedure, as shown in FIG. 19, the image data region of the preceding job 1 (Job1) is subjected to an invalidation process for at least once before the invalidation process for the remaining data is temporarily interrupted to accept the new job 2 (Job2). The image data entered as new job 2 is stored in another region within the hard disk 12.

When the data of the new job 2 is no longer necessary (when new job 2 is completed), the regions storing the data related to the preceding job 1 and the data related to the new job 2 are subjected to data invalidation process which is repeated for a predetermined number of times (N times).

As for the sequence for erasing (invalidating) the plural job data, various erasing order and methods are possible. For example, as shown in the third time chart (a) of FIG. 18, after the processing of data according to new job 2 is completed, data invalidation is performed to the data region of new job 2 repeatedly for a number of times being set (N times), before remaining data invalidation is performed to the data region of the preceding job 1 (second time to Nth time). Or, as shown in the fourth time chart (b) of FIG. 18, after the processing of data according to new job 2 is competed, the remaining number of times of data invalidation are performed to the data region of the preceding job 1 (second time to Nth time) before data invalidation is performed to the data region of new job 2 repeatedly for a number of times being set (N times).

As for the method of interrupting the data erase process performed in the hard disk 12, in the previous explanation it was stated that new job 2 is accepted when one sequence of erasing operations (erasing operation corresponding to a single erasing operation which will be repeated for N times) has been completed. However, if the job data are divided and stored into plural regions (in sector units) in the memory and managed, it may be possible to manage in detail each area storing the data to be erased (manage each sector), such as how many times the data in the sector has been erased, so as to correspond to the newly entered job without delay (that is, to minimize the waiting time of the user).

Moreover, according to the exemplary illustrative embodiment, as shown in the fourth time chart (b), when the processing of the preceding job 1 (Job1) has been completed and while the invalidation process for the data of preceding job 1 is repeatedly performed for a number of times (N times) (or prior thereto, after the Job 1 is accepted), if there is entry of a new job 2 (a reservation for a new job such as operation of the device or input of data), the new job 2 (Job2) is accepted and processed when one sequence of erasing operation (erasing of data corresponding to a single erasing operation to be repeated) has been completed.

Then, when the processing of new job 2 is completed, the data of both the preceding job 1 and new job 2 are invalidated at once.

As shown in FIG. 19, according to the above-mentioned procedure, in the hard disk 12, the image data region of preceding job 1 is subjected to the invalidation process for at least once before the remaining data invalidation process is suspended temporarily, while the new job 2 is accepted and the image data entered as data for new job 2 is stored in a separate region within the hard disk 12.

Then, when the processing of new job 2 is completed (when the data of job 2 is no longer necessary), the regions containing the data of the preceding job 1 and new job 2 are subjected to the data invalidation process that is repeated for a predetermined number of times (N times).

According to the exemplary illustrative embodiment explained above, the following effects are achieved.

According to the image processing device of the exemplary illustrative embodiment, when new image data is entered through the image data input means while a previous image data stored in the image data storage means is being invalidated by the image data invalidation unit, the invalidation process being performed to the previous image data is suspended so as to store the new image data to the region different from the region in which the previous image data is stored. Further, when invalidating the image data stored in the image data storage means, the invalidation process can be performed repeatedly to the region storing the image data for a number of times determined according to the security level of the image data, so that the confidentiality of the stored image data can be protected. Thus, the present device is capable of accepting entry of new image data and processing the new image data efficiently without delay, while improving the security level of the device for the image data being accepted.

According to the present image processing device, when the invalidation process performed by the image data invalidation means to the new image data being input through the image data input means is completed, the new image data can be invalidated by the invalidation means together with the previous image data, according to which the operation for invalidating image data can be performed highly efficiently, and the deterioration of the image data processing ability of the device can be minimized.

Furthermore, the security level of the image data set at the installation site can be ensured.

Now, the third embodiment of the image processing device will be explained with reference to the drawings.

Figure 20:
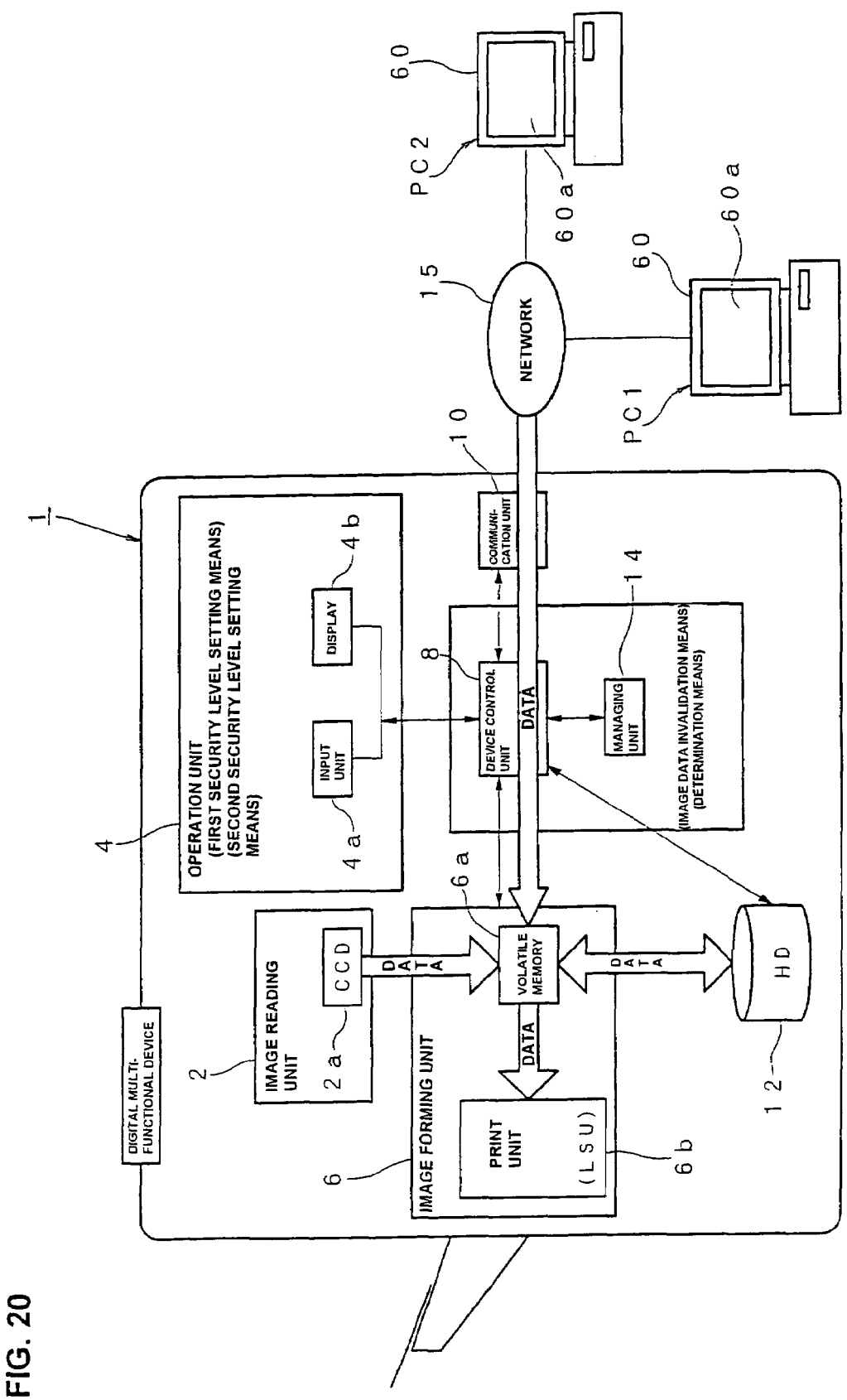
FIG. 20 is an explanatory view showing the schematic configuration of a digital multifunctional device or image processing device according to embodiment 3.

FIG. 20 is an explanatory view showing the schematic configuration of the digital multifunctional device or image processing device according to embodiment 3.

The image processing device according to embodiment 3 has a similar construction as that of embodiment 1, and FIGS. 2 to 13 apply to embodiment 3. Further, the image processing device of embodiment 3 has a similar construction as that of embodiment 2, and FIGS. 18 and 19 apply to embodiment 3. Thus, detailed explanations thereof are omitted.

The digital multifunctional device 1 being the image processing device according to the exemplary illustrative embodiment presented herein comprises, as shown in FIG. 20, an image reading unit 2 functioning as an image data input unit for inputting image data, a hard disk 12 functioning as an image data storage means for storing the image data being input through the image reading unit 2, an image forming unit 6 functioning as an image data processing means for processing the image data stored in the hard disk 12, and an image data invalidation means for invalidating the image data stored in the hard disk 12. Further, the present device 1 comprises a determination means for determining, based on the contents of the image data, whether to prioritize the processing of the invalidation of a preceding image data stored in the hard disk 12 or the storing of the new image data being entered through the image reading unit 2 to the hard disk 12 by the image data invalidation means.

The determination means of the digital multifunctional device 1 of the exemplary illustrative embodiment has a function to determine, based on the security level of the preceding image data being invalidated by the image data invalidation means, whether to continue the invalidation operation of the preceding image data, or to suspends the invalidation operation of the preceding image data to store the new image data being input through the image reading unit 2 to the hard disk 12.

The digital multifunctional device 1 of the exemplary illustrative embodiment is equipped with a first security level setting means for setting the security level of the image data being input.

The digital multifunctional device 1 of the exemplary illustrative embodiment is further equipped with a second security level setting means for setting the security level for each route of input of the image data.

As shown in FIG. 20, the digital multifunctional device 1 of the exemplary illustrative embodiment comprises an image reading unit 2, an operation unit 4, an image forming unit 6, a device control unit 8, a communication unit 10, a hard disk (HD) 12, and a managing unit 14.

The image reading unit 2, the operating unit 4, the image forming unit 6, the device control unit 8, the communication unit 10, the hard disk 12 and the managing unit 14 of the digital multifunctional device 1 of embodiment 3 are substantially equal to those of the digital multifunctional 1 shown in FIG. 1 according to embodiment 1, so detailed explanations thereof are omitted.

In addition, the device control unit 8 and the managing unit 14 function as determination means for determining whether to prioritize the invalidation of the preceding image data stored in the hard disk 12 by the image data invalidation means or the storing of the new image data being input through the image reading unit 2 to the hard disk 12, according to the security level of the image data and based on an optionally set program.

The operation unit 4 comprises a function as a first security level setting means for setting the security level for each image data being entered according to each mode.

Further, the operation unit 4 functions as a second security level setting means for setting the security level for each mode, or each input route of the image data to the device, according to the security environment at the installation site of the digital multifunctional device 1.

Next, we will explain in detail how the present embodiment differs from embodiment 2 in processing the image data efficiently when the input of a new image data is accepted while a preceding image data on the hard disk 12 is being invalidated, and how the security of the stored image data is compensated.

There are cases in which the data invalidation process for the preceding job is prioritized than the storing of new job data being input through the image data input means.

That is, when a job data having a high security level is processed, it is necessary to prioritize the invalidation of this job data having a high security level than the accepting of a new job.

When shown in a time chart, the process flow is represented by the second time chart of FIG. 18 (prior art 2), according to which the job data having a high security level related to the preceding job 1 (Job1) is invalidated repeatedly for a predetermined number of times (N times), before the newly input job 2 (Job2) is accepted. Thereafter, the no longer necessary job data of the new job 2 is invalidated.

According to this digital multifunctional device 1, each job data to be processed is provided with a data being the criterion for determining whether the job data should be processed as having a high security level or not, at the time the processing is requested.

Figure 21:
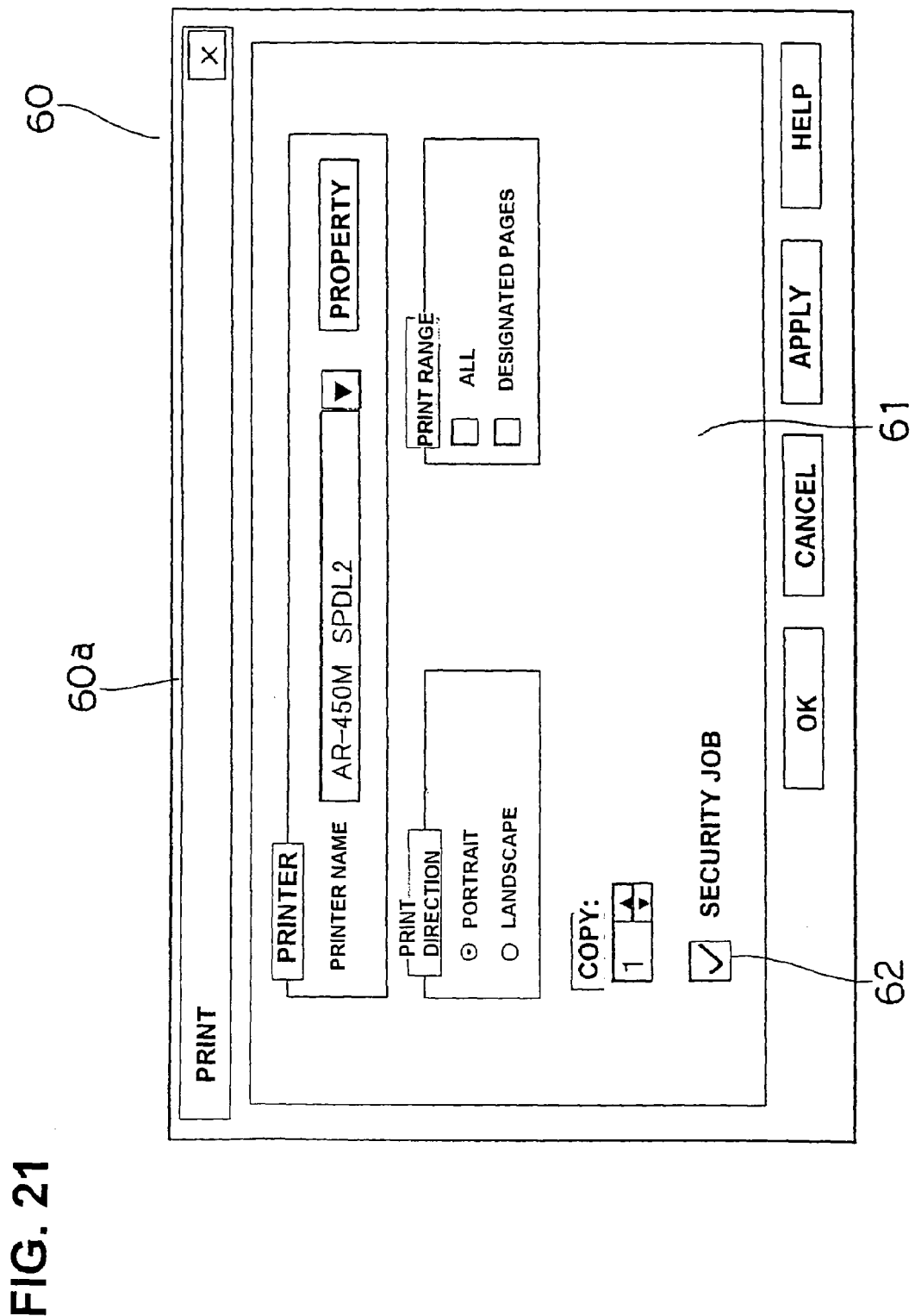
FIG. 21 is an explanatory view showing the setup screen (print driver screen) displayed on the screen of an external device connected to the image processing device according to an exemplary illustrative embodiment.

When the digital multifunctional device 1 is in its printer mode, the above-mentioned criterion information is provided, for example, by entering a checkmark in a checkbox 62 of the "security job" column on a setup screen (print driver screen) 61 displayed as a window on the screen 60a of the display 60 as shown in FIG. 21 when requesting a print job from an external device (PC1, PC2 . . . ) such as a personal computer connected to the device 1 via a network 15.

Then, the digital multi functional device 1 confirms whether the job is provided with this information, and as for the job data having a high security level, the invalidation process is prioritized as shown in the second time chart of FIG. 18 (prior art 2), but as for the job data having a low security level, the storing of the new job data is prioritized as shown in the third time chart (a) or the fourth time chart (b) of FIG. 18.

Though not shown, according to the copy mode or the transmission mode (scanner mode, facsimile mode), a similar checkbox for a security job is prepared for each job on a screen for requesting process on the display 41a of the LCD panel 41 in the control panel 40, so that the user can select the security level when necessary.

Other than entering a checkmark on the security job checkbox for each job, it is possible to set up a security level for each mode, that is, for each entry route of the job data to the digital multifunctional device 1.

This is achieved by setting in advance the security levels for each entry route in an environment setup (security) screen 45 of the LCD panel 41 in the control panel 40 of the device 1.

Figure 22:
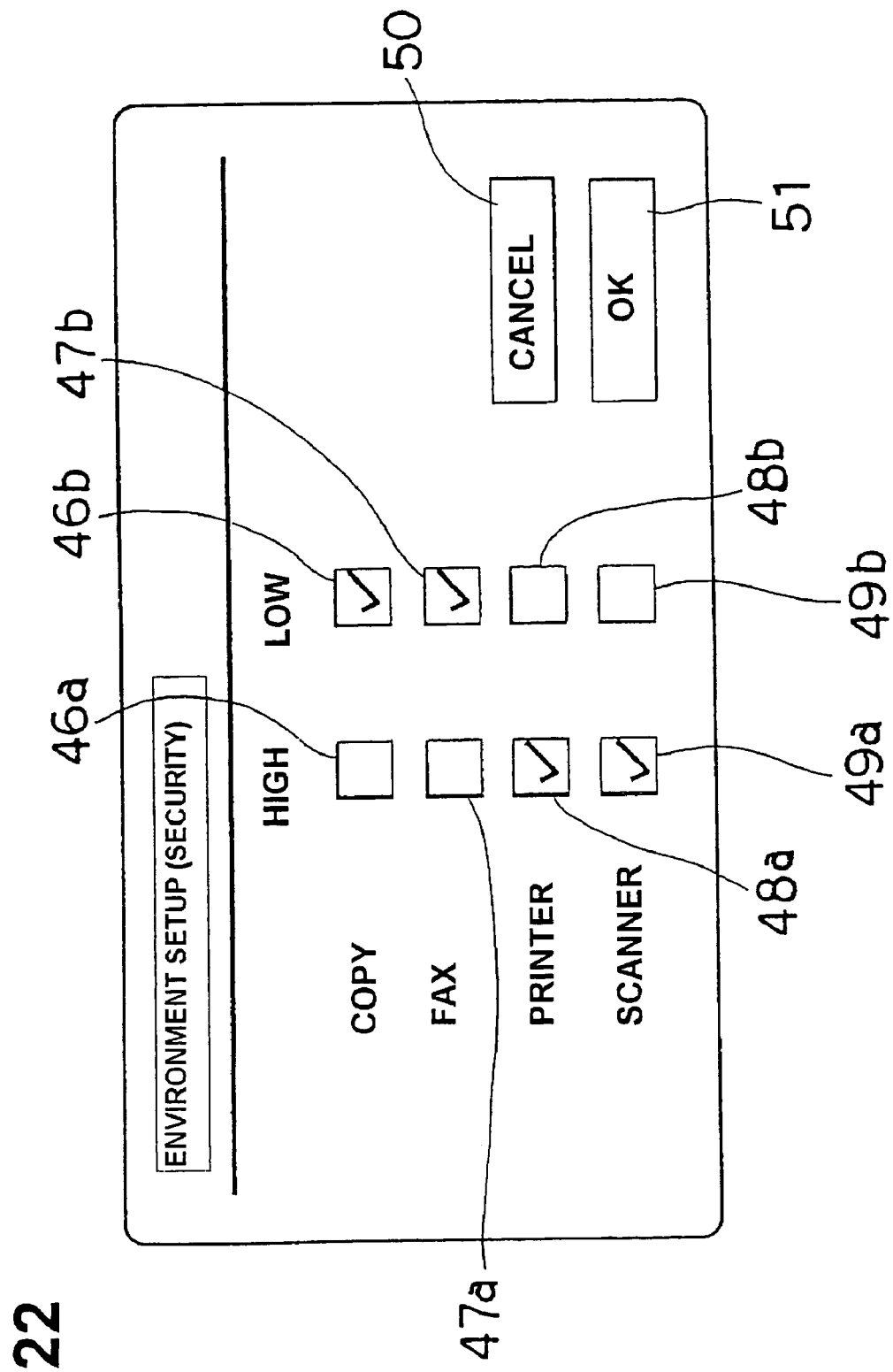
FIG. 22 is an explanatory view (environment setup (security) screen) displayed on the LCD panel of FIG. 2.

FIG. 22 shows the environment setup (security) screen 45 of the LCD panel 41 related to security, according to which the security level can be set up in advance according to each processing mode of image data in the digital multifunctional device 1.

As shown in FIG. 22, the environment setup (security) screen 45 of the LCD panel 41 contains a list of the entry routes through which image data can be input. On the side of the "copy" mode column is a checkbox 46a for setting a high security level and a checkbox 46b for setting a low security level.

Another route of entry of the image data to the device 1 is a "facsimile" mode, and on the side of the "facsimile" mode column is a checkbox 47a for setting a high security level and a checkbox 47b for setting a low security level.

Yet another route of entry of the image data to the device 1 is a "printer" mode, and on the side of the "printer" mode column is a checkbox 48a for setting a high security level and a checkbox 48b for setting a low security level.

Further, another route of entry of the image data to the device 1 is a "scanner" mode, and on the side of the "scanner" mode column is a checkbox 49a for setting a high security level and a checkbox 49b for setting a low security level.

The environment setup (security) screen 45 of the LCD panel 41 includes a "cancel" key 50 disposed on the side of the checkbox 48b and an "OK" key 51 disposed on the side of the checkbox 49b, as shown in FIG. 22.

Next, the setting of the security level for each route of entry of the image data is explained briefly. The present digital multifunctional device 1 includes a copy mode, a facsimile mode, a printer mode and a scanner mode, and the security level for each mode can be set according to the security environment of the installation site of the digital multifunctional device 1.

In FIG. 22, on the environment setup (security) screen 45 of the LCD panel 41, checkmarks are provided in the low security level checkbox 46b of the "copy" mode, the low security level checkbox 47b of the "facsimile" mode, the high security level checkbox 48a of the "printer" mode, and the high security level checkbox 49a of the "scanner" mode.

Thereby, as for the various processing modes for processing image data according to the digital multifunctional device 1 of the present embodiment, the "copy" mode is set to have a low security level, the "facsimile" mode is set to have a low security level, the "printer" mode is set to have a high security level, and the "scanner" mode is set to have a high security level.

The user sets up the security level of each mode in advance considering the security level of the document information to be processed, the object and the environment of use of the device etc. in this environment setup (security) screen 45.

According to the determined security level, the preceding job data entered to the digital multifunctional device 1 and stored thereto through a process mode having a high security level is invalidated with higher priority than the storing of new job data.

The following effects are achieved by the present invention explained above.

According to the image processing device of the exemplary illustrative embodiment presented herein, if input of new image data through the image data input means is confirmed while a preceding image data stored in the image data storage means is being invalidated by the image data invalidation means, the determination means determines whether to prioritize the invalidation by the image data invalidation means of the preceding image data stored in the image data storage means or the storage of new image data to the image data storage means being input through the image data input means, according to the contents of the image data. Therefore, according to the contents of the preceding image data being invalidated, the device may interrupt the invalidation process to accept storage of the new image data to the image data storage means. When invalidating the image data stored in the image data storage means, the invalidation process can be repeatedly performed to the region in which the image data is stored according to the contents of the image data, so as to achieve a sufficient protection of the confidentiality of the stored image data. The present device can accept the input of a new image data to be processed by the device and process the received image data efficiently without delay, and still improve the security level of the image data received as a job and stored in the device.

According to the image processing device of the exemplary illustrative embodiment presented herein, the determination means can determine according to the security level of the preceding image data being invalidated by the image data invalidation means whether to continue the invalidation of the preceding data or to interrupt the invalidation process of the preceding image data to store the new image data being input through the image data input means to the image data storage means. Thus, the determination means of the exemplary illustrative embodiment can determine based on the security level of the preceding image data the priority of the invalidation of the preceding image data and the storing of new image data. If the invalidation of the preceding image data has higher priority than the storing of new image data to the image data storage means, the invalidation process of the preceding image data will not be interrupted, so the security level of the image data received by the device is improved. If the storage of the new image data to the image data storage means has higher priority over the invalidation of the preceding image data according to the security level of the image data, the image data received by the device as a new job can be processed efficiently without delay.

According to the image processing device of the exemplary illustrative embodiment presented herein, the user can set up the security level of the image data being entered, simply by inputting the security level through the first security level setting means, so the user can utilize this function effectively.

Of the various image data processed by the device, only the selected image data having a high security level are subjected to the invalidation process, so new data being input to the device can be processed without delay.

According further to the image processing device of the exemplary illustrative embodiment, the user can set up the security level for each image data processing mode according to the security environment at the installation site by simply determining the security levels for each route of entry of the image data through the second security level setting means, so the user can utilize this function effectively.

Of the various image data processed by the device, only the image data processed by the processing mode having a high security level are subjected to the invalidation process, so new data being input to the device can be processed without delay.

As explained, the present invention provides an image processing device capable of invalidating the image data stored in the image data storage means (memory) by repeatedly invalidating the memory region in which the image data is stored according to the determined security level, so as to achieve sufficient protection of the confidentiality of the image data, while minimizing the degradation of the efficiency to accept and process new image data by the image processing device during invalidation of the stored image data.

What is claimed is:

1. An image processing device comprising:
an image data input unit for inputting image data;
an image data storage unit for storing the image data input through the image data input unit;
an image data processing unit for processing the image data stored in the image data storage unit; and
an image data invalidation unit for invalidating the image data stored in the image data storage unit; wherein
when there is input of a new image data through said image data input unit while said image data invalidation unit is performing invalidation of a preceding image data stored in said image data storage unit, said image data invalidation unit is configured to interrupt the invalidation of said preceding image data stored in said image data storage unit, and the image data invalidation unit is configured to invalidate said preceding image data by writing the new input image data over a region in which the preceding data is stored.

2. An image processing device comprising:
an image data input unit for inputting image data;
an image data storage unit for storing the image data input through the image data input unit;
an image data processing unit for processing the image data stored in the image data storage unit; and
an image data invalidation unit for invalidating the image data stored in the image data storage unit; wherein
when there is input of a new image data through said image data input unit after a preceding image data has been processed but before said image data invalidation unit has staffed the invalidation of said preceding image data stored in said image data storage unit, said image data invalidation unit is configured to store said new image data being input to said device over a region in which the preceding data is stored.

3. An image processing device according to claim 1, wherein said image data invalidation unit is configured to invalidate said new image data together with said preceding image data when performing invalidation of said new image data being input through said image data input unit.

4. An image processing device according to claim 2, wherein said image data invalidation unit is configured to invalidate said new image data together with said preceding image data when performing invalidation of said new image data being input through said image data input unit.

5. An image processing device comprising:
an image data input unit for inputting image data;
an image data storage unit for storing the image data input through the image data input unit;
an image data processing unit for processing the image data stored in the image data storage unit; and
an image data invalidation unit for invalidating the image data stored in the image data storage unit; wherein
when there is input of a new image data through said image data input unit while said image data invalidation unit is performing invalidation of a preceding image data stored in said image data storage unit, said image data invalidation unit is configured to interrupt the invalidation of said preceding image data stored in said image data storage unit so as to store in said image data storage unit said new image data being input to said device.

6. An image processing device comprising:
an image data input unit for inputting image data;
an image data storage unit for storing the image data input through the image data input unit;
an image data processing unit for processing the image data stored in the image data storage unit; and
an image data invalidation unit for invalidating the image data stored in the image data storage unit; wherein
said image data invalidation unit is configured to interrupt the invalidation of a preceding image data stored in said image data storage unit when input of a new image data through said image data input unit is confirmed while said image data invalidation unit is performing invalidation of said preceding image data being stored in said image data storage unit, so as to store said new image data in a region of said image data storage unit that is different from the region in which said preceding image data is stored.

7. An image processing device according to claim 6, wherein said image data invalidation unit is configured to invalidate said new image data together with said preceding image data when performing invalidation of said new image data being input through said image data input unit.

8. An image processing device according to claim 6, wherein when there is input of a new image data through said image data input unit while said image data invalidation unit is performing invalidation of a preceding image data being stored in said image data storage unit, said image data invalidation unit is configured to interrupt the invalidation of the preceding image data stored in said image data storage unit so as to store in said image data storage unit the new image data being input to said device.

9. An image processing device comprising:
an image data input unit for inputting image data;
an image data storage unit for storing the image data input through the image data input unit;
an image data processing unit for processing the image data stored in the image data storage unit;
an image data invalidation unit for invalidating the image data stored in the image data storage unit; and
a determination unit for determining whether to prioritize the invalidation by said image data invalidation unit of a preceding image data stored in said image data storage unit or the storage of a new image data being input through said image data input unit to said image data storage unit, based on the contents of said image data.

10. An image processing device according to claim 9, wherein said determination unit is configured to determine, according to a security level set for said preceding image data being invalidated by said image data invalidation unit, whether to continue invalidation of said preceding image data by said image data invalidation unit or to interrupt the invalidation of said preceding image data by said image data invalidation unit so as to store said new image data being input through said image data input unit to said image data storage unit.

11. An image processing device according to claim 9, further comprising a first security level setting unit for setting up a security level for the image data being input to said device.

12. An image processing device according to claim 9, further comprising a second security level setting unit for setting up a security level for each route of input of said image data to said device.

13. An image processing device according to claim 5, wherein said new image data is stored in said image data storage unit after one sequence of invalidating of said preceding image data is completed.

* * * * *